(12) United States Patent
O'Donnell et al.

(10) Patent No.: US 11,298,575 B2
(45) Date of Patent: Apr. 12, 2022

(54) SYSTEMS AND METHODS FOR TRAINING FIREFIGHTERS

(71) Applicant: FLASHPOINT FIRE EQUIPMENT, INC., Troy, NY (US)

(72) Inventors: Ryan O'Donnell, Troy, NY (US); Michael T. Nixon, Sherwood Park (CA)

(73) Assignee: Flashpoint Fire Equipment, Inc., Sherwood Park (CA)

( * ) Notice: Subject to any disclaimer, the term of this patent is extended or adjusted under 35 U.S.C. 154(b) by 329 days.

(21) Appl. No.: 16/377,438

(22) Filed: Apr. 8, 2019

(65) Prior Publication Data

US 2019/0308049 A1    Oct. 10, 2019

Related U.S. Application Data

(60) Provisional application No. 62/655,729, filed on Apr. 10, 2018, provisional application No. 62/732,465, filed on Sep. 17, 2018.

(51) Int. Cl.
| | |
|---|---|
| *A62C 99/00* | (2010.01) |
| *G09B 25/04* | (2006.01) |
| *G09B 19/00* | (2006.01) |
| *G09B 9/00* | (2006.01) |

(52) U.S. Cl.
CPC .......... *A62C 99/0081* (2013.01); *G09B 9/006* (2013.01); *G09B 19/00* (2013.01); *G09B 25/04* (2013.01)

(58) Field of Classification Search
CPC ... A62C 99/00; A62C 99/008; A62C 99/0081; G09B 9/00; G09B 9/006; G09B 19/00; G09B 25/04
See application file for complete search history.

(56) References Cited

U.S. PATENT DOCUMENTS

| | | | | | |
|---|---|---|---|---|---|
| 4,983,124 | A | * | 1/1991 | Ernst | A62C 99/0081 434/226 |
| 5,518,402 | A | * | 5/1996 | Tommarello | A62C 99/0081 434/219 |
| 2004/0004547 | A1 | * | 1/2004 | Appelt | G08B 21/182 340/573.1 |

OTHER PUBLICATIONS

Lion Group, Fire Training Facilities, website: https://www.lionprotects.com/fire-training-buildings, accessed Apr. 18, 2018.

* cited by examiner

*Primary Examiner* — Timothy A Musselman
(74) *Attorney, Agent, or Firm* — Tech Valley Patent, LLC; John Pietrangelo

(57) ABSTRACT

Systems and methods for training firefighters and other first responders are provided. The systems include a plurality of sensors configured to detect at least one ambient condition, such as, temperature; a receiver configured to receive the electric signals from the plurality of sensors; and a digital storage device operatively connected to the receiver and adapted to store the electrical signals corresponding to the detected ambient conditions. The data detected by the sensors can be retrieved for later review, analysis, and training. The systems may include at least one video recorder and/or at least one infrared image recorder each configured to detect images that can be stored for later retrieval and a synchronizing device adapted to synchronize the sensor data with the recorded images for later review. Methods of implementing the systems and portable cases enclosing the system are also provided.

26 Claims, 16 Drawing Sheets

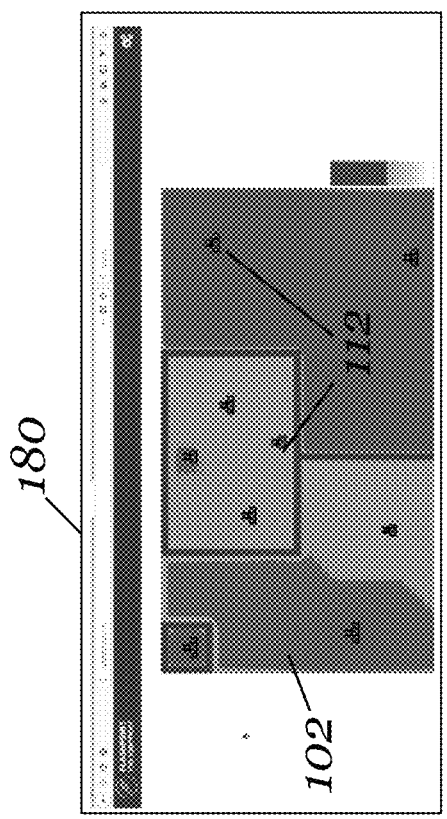
*Figure 19*
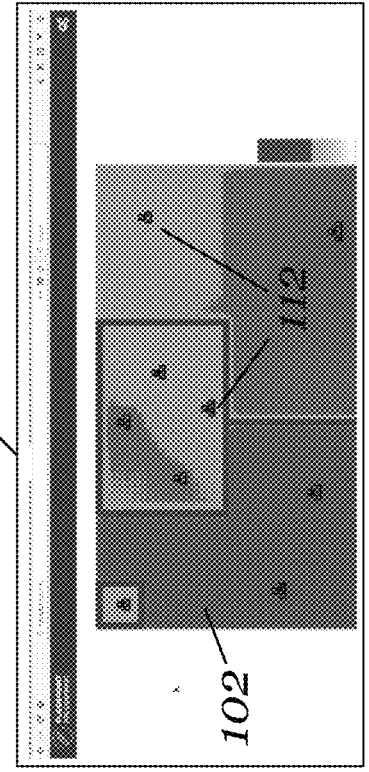
*Figure 20*
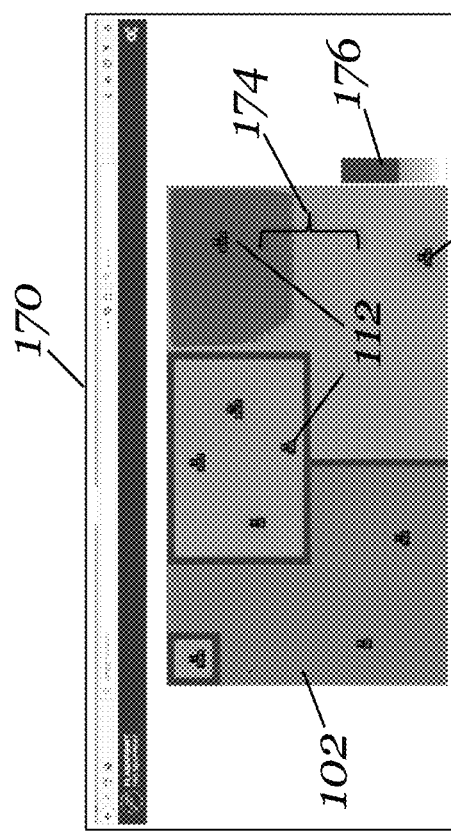
*Figure 21*
*Figure 22*

SYSTEMS AND METHODS FOR TRAINING FIREFIGHTERS

CROSS-REFERENCE TO RELATED APPLICATIONS

This application claims priority to U.S. Provisional Patent Application 62/655,729, filed on Apr. 10, 2018, and to U.S. Provisional Patent Application 62/732,465, filed on Sep. 17, 2018, the disclosures of which are included by reference herein in their entirety.

BACKGROUND OF THE INVENTION

Technical Field

The present invention generally relates to firefighter monitoring or training systems and methods. More particularly, the present invention relates to firefighter monitoring or training systems and methods where ambient conditions, for example, temperature, infrared images within a structure and videos, for example, of external videos of structures and firefighter technique are detected and processed to provide evaluation, guidance, and training in effective firefighter practices.

Description of Related Art

It is generally understood in the firefighting art that the number of structure fires is declining while the "modern fire environment" (that is, lightweight building construction, more air-tight building construction, and energy-rich building materials, furnishings, and finishings) mean that fires burn hotter and faster than in the past. This higher complexity fire environment, combined with present trends of fewer actual fires, means that firefighters must learn less from "on-the-job" experience and more from training, or "training evolutions," as known in the art.

There are a number of types of facilities used for firefighter training, ranging from acquired structures (that is, burning down an actual building) to purpose-built concrete structures in which class A fires may be lit and extinguished, to buildings with sophisticated gas-fueled props to simulate live-fire conditions.

In facilities where a manufactured system or product creates a fire (class B—flammable gas driven fires, or class A/B hybrid systems) and, occasionally, in class A systems, sensor networks may be installed to control the fire apparatus and/or to alarm when unsafe or potentially unsafe conditions arise. These sensor networks are typically integrated into the live-fire control systems and are building-specific, for example, with fixed locations of sensors.

As firefighters become more educated on fire dynamics, fire behavior, and fire science, there is an increased emphasis in the field on measuring fire conditions and understanding how firefighting tactics affect fire conditions. For example, in ventilation-limited fires, if fire crews open a door to the fire room and allow air to reach the fire, the temperature of the fire is likely to increase as the fire grows.

There is also greater understanding in the field due to research recently conducted on how conditions relate to victim tenability and survivability (for example, as expressed as, "fractional effective dose").

Outside of simple temperature monitoring thermocouple readers, there are no systems in the firefighting field that can log and display data from sensors inside of training evolutions, and related situations.

SUMMARY OF THE INVENTION

Aspects of the present invention address the disadvantages and shortcomings in the field of firefighter training. Aspects of the invention provide systems that have the capability of taking a number of sensor inputs, hard-wired or wireless, and displaying the data for viewing by, for example, firefighter trainers and trainees. This data, for example, temperature data, can be displayed on "layers" overlaid on a building map or floor plan.

Aspects of the invention can display raw data, such as temperature, interpolate data between data points, and visually display the data (for example, temperature in a "heat map"). In some aspects, the data can be displayed as overlay layers of graphic data. In other aspects, victim tenability and/or victim survivability zones can be calculated by analyzing multiple streams of data and enclosure dimensions, among other inputs.

Aspects of the invention can provide video recording of firefighter training exercises, or actual live firefighter performance, and, in one aspect, coordinate the video recordings with the sensor data recordings to provide synchronized and substantially complete documentation of both firefighter training and fire characteristics and dynamics for future review and evaluation.

One embodiment of the invention is a system for training firefighters, the system comprising or including a plurality of sensors configured to detect at least one ambient condition, such as, temperature, each of the sensors adapted to generate an electrical signal corresponding to the detected ambient condition; a receiver configured to receive the electric signals from the plurality of sensors; and a digital storage device operatively connected to the receiver and adapted to store the electrical signals. In one aspect of the invention, the at least one ambient condition may comprise temperature, humidity, chemical concentration, explosion limits, or presence of personnel, among others.

In one aspect, the system may further include a processor configured to receive the electrical signals from the receiver, physical conditions of an enclosure where the plurality of sensors are positioned, and positions of the plurality of sensors, and using the electrical signals, the physical conditions of the enclosure and the positions, calculate variations in the at least one ambient condition between the positions. In one aspect, the processor may further calculate victim tenability and/or victim survivability.

Another embodiment of the invention is a method for training firefighters, the method comprising or including: with a plurality of sensors, detecting at least one ambient condition and generating an electrical signal corresponding to the detected ambient condition; transmitting the electrical signal to a receiver; and storing the electrical signals. In one aspect, the method may further include, with at least one processor, calculating variations in the at least one ambient condition for each of the plurality of sensors. In one aspect, the processor may calculate victim tenability and/or victim survivability.

In one aspect, the step of detecting at least one ambient condition may be practiced by detecting the at least one ambient condition in an enclosure, for example, in a firefighter training structure.

In one aspect, the method may further comprise wirelessly transmitting the electrical signal corresponding to the detected ambient condition to the receiver.

In one aspect, the method may further comprise displaying the detected ambient conditions.

In one aspect, the method may further include comparing the detected ambient condition to a threshold ambient condition, and, when the threshold ambient condition is approached or exceeded, advising the user, for example, with a visual or audible signal or alarm.

In one aspect, the method and systems disclosed herein may be adapted to determine a performance score, for example, a firefighting effectiveness score, for a trainee or team of trainees. In another aspect, a performance score of one trainee or team of trainees may be compared to the performance score of another trainee or team of trainees to compare the performance between the two trainees or team of trainees.

Another embodiment of the invention is a portable firefighter training system comprising a case, for example, a clamshell case, and any one of the systems recited above positioned in the case.

Another embodiment of the invention is a system for monitoring firefighters, for example, training firefighters, the system comprising or including: a plurality of sensors configured to detect at least one ambient condition, each of the sensors adapted to generate an electrical signal corresponding to the detected ambient condition; at least one video recorder configured to detect substantially continuous video images, the video recorder adapted to generate electrical signals corresponding to the detected video images; at least one receiver configured to receive the electric signals from the plurality of sensors and the electrical signals from the at least one video recorder; and a digital storage device operatively connected to the receiver and adapted to store electric signals from the plurality of sensors and the electrical signals from the at least one video recorder.

In one aspect, the system further comprises a synchronizing device or synchronizer adapted to synchronize the electric signals from the plurality of sensors with the electrical signals from the at least one video recorder. For example, the synchronizer may be an audible signal, a visual signal, or a haptic (that is, motion or vibration) signal.

In one aspect, the at least one video recorder may be a visual light recorder and/or an infrared light recorder.

In another aspect, the at least one ambient condition may be temperature, humidity, chemical concentration, explosion limits, or presence of personnel, among others.

In one aspect, the system may be employed in and about a firefighter training structure.

Another embodiment of the invention is a method for monitoring firefighters, for example, training firefighters, the method comprising or including: with a plurality of sensors, detecting at least one ambient condition and generating an electrical signal corresponding to the detected ambient condition; recording substantially continuous video images with at least one video recorder, the at least one video recorder adapted to generate electrical signals corresponding to the detected video images; transmitting the electrical signal from the plurality of sensors and the electrical signals from the at least one video recorder to a receiver; and storing the electrical signal from the plurality of sensors and the electrical signals from the at least one video recorder. In one aspect, the stored signals may be retrieved and reviewed for training purposes.

In one aspect, the method may further include synchronizing the electric signals from the plurality of sensors with the electrical signals from the at least one video recorder. For example, in one aspect, the synchronizing is practiced with an audible signal, a visual signal, and/or a haptic signal.

In one aspect, the recording substantially continuous video images may be practiced by recording visual images and/or recording infrared images.

In another aspect, the method may further include displaying images of the electrical signal corresponding to the detected ambient condition and images of the recorded substantially continuous video images, for example, on a single display.

A further embodiment of the invention is a portable firefighter monitoring system, for example, firefighter training system, comprising a case, and any one of the systems recited above positioned in the case.

According to aspect of the invention, systems and methods are provided that can be used for monitoring personnel performance; monitoring safety or danger of an incidence of fire, gas leak, or chemical spill; monitoring or evaluating the presence of fuel during fire, gas leak, or chemical spill; monitoring or evaluating building characteristics; and conducting experiments.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIGS. 19 through 22 are screen shots of system output according to one aspect of the invention.

DETAILED DESCRIPTION OF THE INVENTION

In the following discussion, embodiments and aspects of the invention may be described with respect to their application to firefighter or first responder monitoring and/or training. However, as described herein, aspects of the present invention are not limited to firefighter training, but may be adapted for use in a broad range of applications and uses. For example, aspects of the present invention may be used for monitoring personnel performance (for example, firefighter performance); for monitoring the safety or danger of an incidence of fire, a gas leak, and/or a chemical spill; for monitoring or evaluating the presence of "fuel" during fire, gas leak and/or chemical spill; for monitoring or evaluating building characteristics (such as, structural integrity and/or potential for collapse); and/or to conduct experiments (for example, on new firefighting techniques or new firefighting equipment). Accordingly, the following disclosure should be viewed in the context of all these applications of aspects of the invention.

Figure 1:
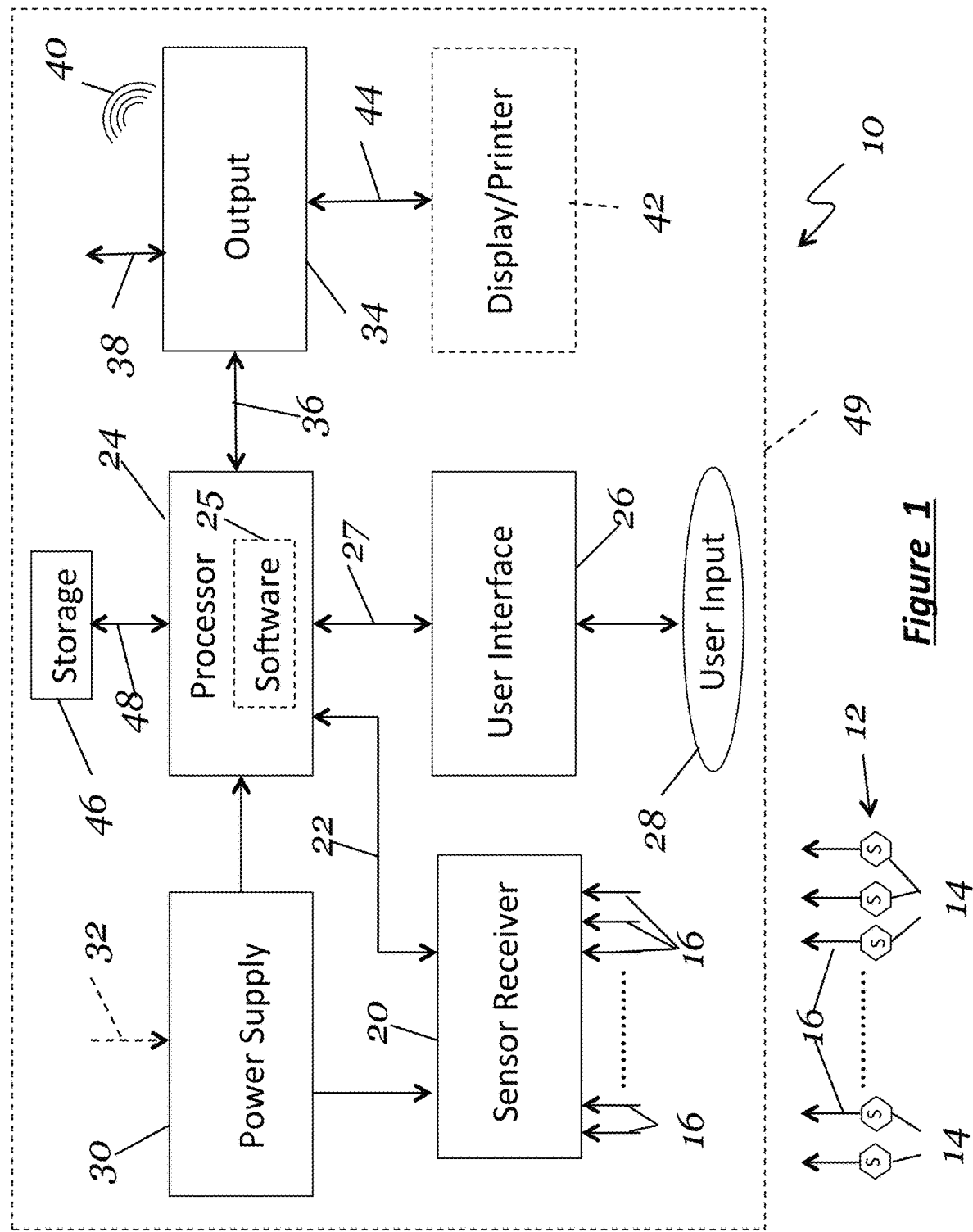
FIG. 1 is a schematic diagram of a system for training firefighters and other personnel according to one aspect of the invention.

FIG. 1 is a schematic diagram of a system 10 for monitoring and/or training firefighters according to one aspect of the invention. As shown in FIG. 1, system 10 includes a plurality 12 of sensors 14, each of the sensors 14 configured to detect an ambient condition, such as, temperature, and output a signal 16 corresponding to the detected ambient conditions. Signal 16 may be a wired or wireless signal. According to aspects of the invention, system 10 includes one or more sensor receivers 20 adapted to receive signals 16 (wired and/or wireless) and then transmit (wired and/or wirelessly) one or more signals 22 corresponding to the detected ambient conditions to one or more processors 24. In addition, in one aspect, system 10 may also include one or more video recorders (not shown in FIG. 1), for example, a still and/or video camera, and/or one or more infrared recorders, for example, an infrared or thermal camera or infrared or thermal video image detector (as shown in FIGS. 26 through 32). According to aspects of the invention, 3 or more, 4 or more, or 10 or more video recorders and/or infrared recorders may be provided.

In the following discussion, in describing aspects of the invention, for the sake of ease of illustration, the ambient condition detected by sensors 14 may be referred to as "temperature," and sensors 14 may be referred to as "temperature sensors." However, it is envisioned that aspects of the invention are not limited to the sensing of temperature but may comprise one or more of a broad range of conditions, characteristics, and features of the environment and/or the atmosphere, for example, within an enclosure. These conditions include, but are not limited to, temperature, humidity, chemical concentration, explosion limits, oxygen ($O_2$) concentration, carbon monoxide (CO) concentration, carbon dioxide ($CO_2$) concentration, percent of "lower explosion limit" (% LEL), percent of "upper explosion limit" (% UEL), presence or concentration of volatile organic compounds (VOCs), hydrogen cyanide (HCN) presence or concentration, heat flux, the presence of personnel (for example, victims), the presence of firefighting personnel, the proximity of personnel (for example, of a firefighter or first responder to a victim), personnel location (for example, of a firefighter or first responder), the presence of a victim "dummy" (for example, during training exercises), the location of a victim dummy, the evidence of water application (for example, from firefighting hose lines), gas velocities (for example, air velocity and/or smoke velocity), the presence or concentration of particulates in the air (for example, of nanoparticle particulates). These and other ambient conditions can be detected and, for example, displayed, according to aspects of the present invention. Other conditions, characteristics, and features that may be detected by sensors 14 will be apparent to those of skill in this art, for example, professional firefighters.

System 10 includes a user interface 26 configured to receive user input 28, for example, sensor location, start/stop scenario, record scenario, the identification or marking of key milestones and/or events during the evolution or training exercise, to change views, and to create floor plans and building layouts, among other user inputs. User interface 26 may be a keypad, a keyboard, a stylus controlled screen, a touch screen, a voice-activated device, or any other device configured to receive input from a user. User interface 26 may be adapted to receive input from a local and/or a remote user (wired and/or wirelessly), for example, a user accessing system 10 via a network, for instance, over the Internet or over a local wireless network. User interface 26 may typically be configured to communicate (wired and/or wirelessly) with processor 24 via connection 27, for example, to transfer electrical signals corresponding to the user input to processor 24.

System 10 in FIG. 1 may also include a power supply 30 adapted to provide electrical power to the components of system 10, among other devices. Power supply 30 may be powered by connection 32 by power from the grid, from a local power source (for example, solar power, wind power, or fuel cell power), or may include one or more batteries, for example, rechargeable batteries.

System 10 in may also include one or more output devices 34, for example, a transmitter adapted to receive (wired and/or wirelessly) electrical signals 36 from processor 24 and transmit signals corresponding to the signals received, for example, by wire 38 and/or wirelessly 40 to a local or remote receiver (not shown).

In one aspect, system 10 may include one or more displays 42 adapted to receive electrical signals 44 from output device 34 and display data corresponding to the received signals, for example, one of more ambient conditions detected by the sensors 14, one or more videos recorded by video and/or infrared recorder, and/or data produced from ambient conditions detected by sensors 14 by processor 24. The device 42 may also be a printer.

In one aspect, system 10 may include one or more digital storage devices 46 adapted to communicate with processor 24 (wired or wirelessly) via connection 48. The storage device 42 may be conventional digital storage device.

The one or more processors or central processing units (CPUs) 24, for example, a computer processor, typically includes one or more memory devices containing software 25 configured to manipulate the data streams from sensors 14 and the data streams from user interface 26 and generate data of use to, for example, the user. Software 25 is typically executable on processor 24 and software 25 may be adapted to access storage device 46. For example, software 25 may typically be adapted to introduce information to, extract information from, and/or otherwise manipulate data on storage device 46, for instance, images recorded by video and or infrared recorders (not shown in FIG. 1).

As also shown in FIG. 1, system 10 may be provided in an enclosure, cabinet, or case 49, for example, a portable case where system 10 can be conveniently transported to, for example, a firefighter-training site or facility. (See FIGS. 23 and 24 for one example of an enclosure according to an aspect of the invention.) In another aspect, system 10 may not be readily portable, but may be substantially permanently installed at a firefighter-training site or facility.

Figure 2:
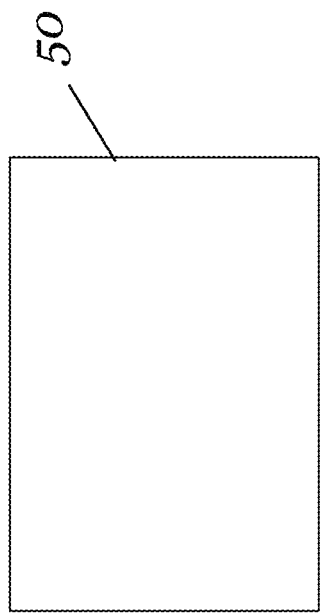

FIGS. 2 through 5 are floor plan diagrams of user input according to one aspect of the invention. FIG. 2 is an example of an enclosure floor plan 50, for example, defined by user input, presented to the user for input of enclosure information according to one aspect of the invention. Floor plan 50 may be an actual floor plan upon which firefighter training is being implemented, or a model of a floor plan. For example, floor plan 50 may be a basic outline of the square footage of the floor plan or one of the floor plans of the structure, building, or facility into which sensors will be placed according to one aspect of the invention. User input may also include height of the ceiling of floor plan 50, type of construction of floor plan 50, and material of construction of floor plan 50.

Figure 3:
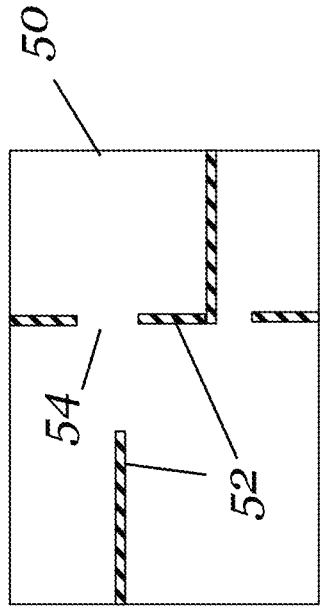
FIGS. 2 through 5 are floor plan diagrams of user input according to one aspect of the invention.

FIG. 3 is an example of the enclosure floor plan 50 shown in FIG. 2 after a user has defined the structures within the floor plan 50, for example, walls 52, and openings 54. User input may also include material of construction of walls 52 and dimensions of openings 54, among other things.

Figure 4:
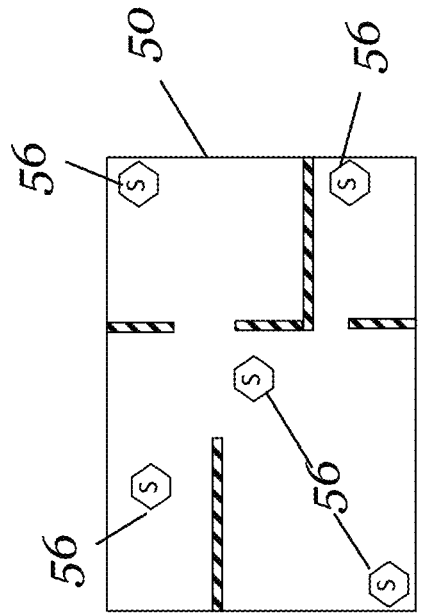

FIG. 4 is an example of the enclosure floor plan 50 shown in FIG. 3 after a user has located sensors 56 within the floor plan 50, for example, where actual sensors 56 were located within an existing physical structure having the floor plan 50. User input may also include the type of sensor, the manufacture of the sensor, and the elevation of the sensor, for example, the elevation above the floor of floor plan 50. Sensors 56 may be temperature sensors, humidity sensors, chemical concentration sensors, personnel sensors, or any sensor configured to detect one or more of the conditions listed herein, among other types of sensors. Though not shown in FIG. 4, sensors 56 may communicate with a receiver, for example, receiver 20 in FIG. 1, by wire and/or wirelessly.

Figure 5:
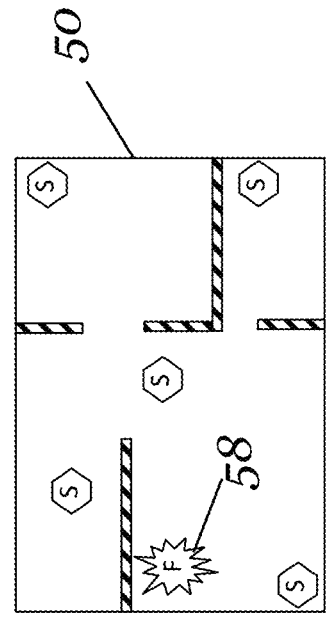

FIG. 5 is an example of the enclosure floor plan 50 shown in FIG. 4 after a user has located one or more sources of fire 58 within the floor plan 50. User input may also include the type of fire 58, the type of fuel feeding fire 58, the temperature of the fire, and/or the elevation of the fire, for example, the elevation above the floor of floor plan 50.

Figure 6:
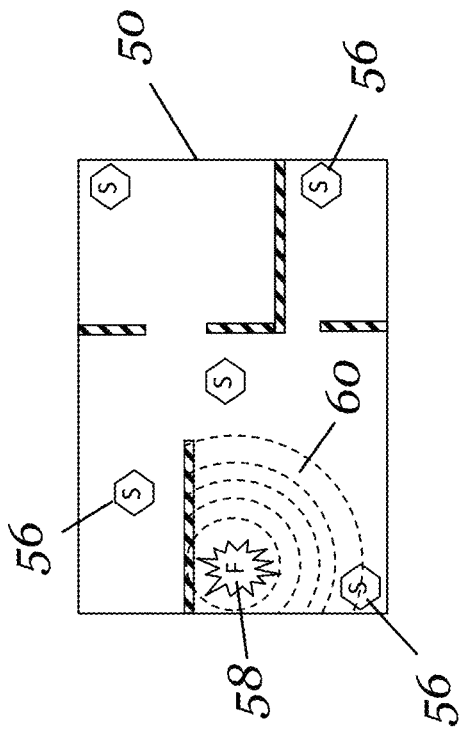
FIGS. 6 through 9 are floor plan diagrams of system output based upon the user input provided in FIGS. 2 through 5 according to one aspect of the invention.
Figure 7:
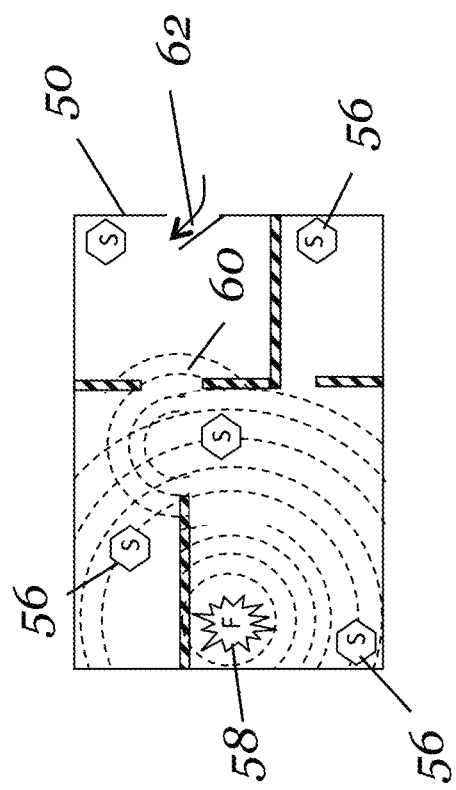
Figure 8:
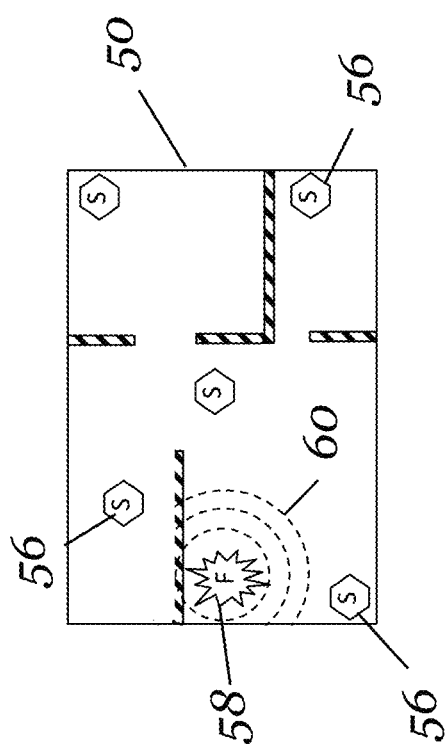

FIGS. 6 through 9 are floor plan diagrams of system output based upon the user input provided in FIGS. 2 through 5 according to one aspect of the invention. FIGS. 6 through 8 represent typical temperature gradients 60 that may be detected by sensors 56 as the fire 58 propagates through floor plan 50 and displayed to the user, for example, a firefighter trainee.

Figure 9:
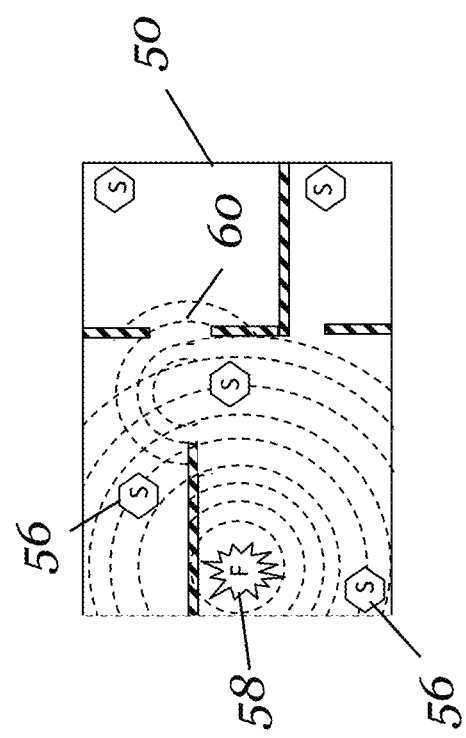

FIG. 9 represents typical temperature gradients 60 that may be detected by sensors 56 as the fire 58 propagates through floor plan 50 and is further affected by the introducing of one or more drafts 62, for example, of outside air, into floor plan 50.

Figure 10:
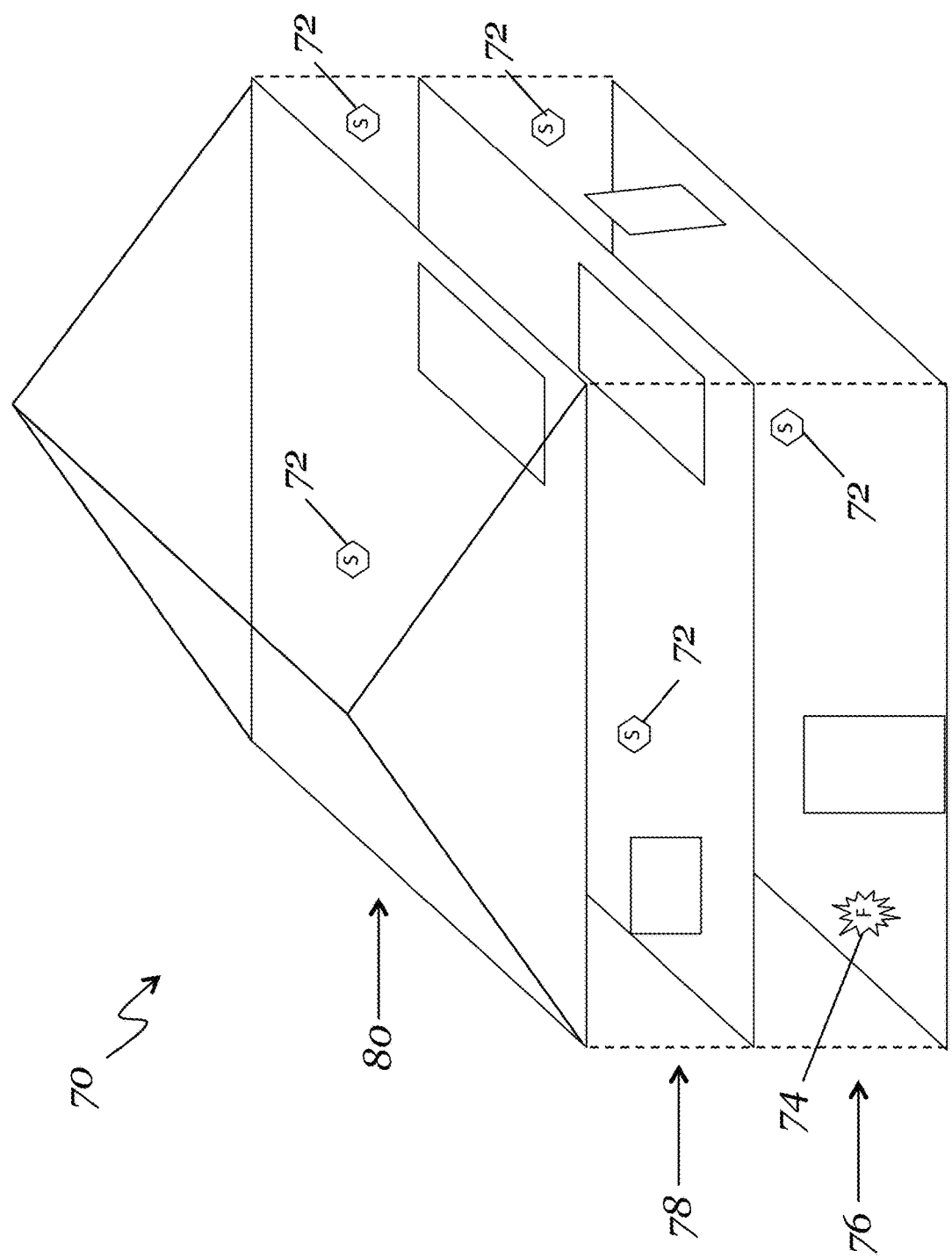
FIG. 10 is a building floor plan representing user input according to one aspect of the invention.

FIG. 10 is a building floor plan 70 representing user input according to one aspect of the invention. According to aspects of the invention, building floor plan 70 may include one or more sensors 72 and one or more sources of fire 74, for example, identified by a user. According to aspects of the invention, buildings or structures having two or more floors may be used for aspects of the invention, for example, firefighter training. Though first floor 76, second floor 78, and attic 80 are shown in FIG. 10, building floor plan 70 may comprise any conceivable structure or facility, home or residence, office or factory, which may be used for firefighter training and/or evaluation. In one aspect, sensors 72 may be located within an actual physical structure 70. In another aspect, a model of structure 70 may be created, for example, a "virtual" model, and sensors 72 may be located within the model. In one aspect of the invention, aspects of the invention may be applied to scale model structures, for example, "doll house" type structures, that can be used for training to illustrate fire propagation that may occur in full-scale structures. For example, in one aspect, sensors 72 may be located within a physical scale model structure. In another aspect, models of scale models, for example, a "virtual" scale model, may be created and sensors 72 may be located within the scale model.

In addition to the floor plan displays and analyses, for example, as shown in FIGS. 15 through 22, and the three-dimensional structure display and analysis shown in FIG. 10, in one aspect of the invention, elevation views for structures may also be displayed and analyzed. For example, in one aspect, a front elevation view or an internal elevation view, for instance, through a cross section of a structure may be displayed and analyzed. In one aspect, similar to the user input shown in FIGS. 2 through 5, an elevation view of a structure with one or more floors may be displayed and the walls and sensors located by user input. Accordingly, in a fashion similar to that shown in FIGS. 19 through 23, elevation views of results of the analysis may be provided. For example, an elevation view of a structure may be provided showing the vertical propagation of a fire, a gas leak, or a volatile chemical spill.

Figure 11:
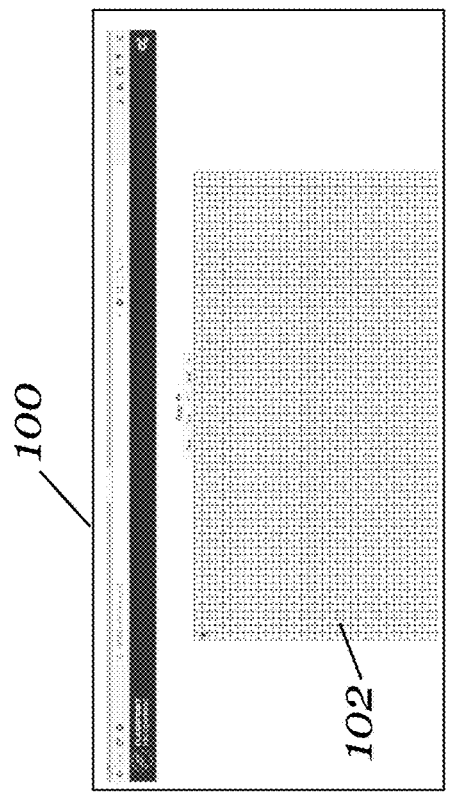
FIGS. 11 through 18 are screen shots of a user interface that may be used for user input and system output according to one aspect of the invention.

FIGS. 11 through 18 are screen shots of a user interface that may be used for user input according to one aspect of the invention. FIG. 11 is a screen shot 90 of a display presented to a user, for example, to a trainer or training facilitator, according to one aspect of the invention. As shown in FIG. 11, screen shot 90 includes fields for user input for creation of a new floor plan, or "map", in field 92; the selection of an existing or previously defined floor plan, or "map", in drop down menu 94; and the selection of temperature scale, that is, Celsius or Fahrenheit, with radio buttons 96. Other data that may be input by a user in fields or radio buttons in screen shot 90 include, but are not limited to, the name of the user, the name of the facility, the location of the facility, the number of floors in the facility or structure, the square footage of each floor, the ambient temperature, the ambient wind speed and direction, and the time of day and date of the training procedure.

Figure 12:
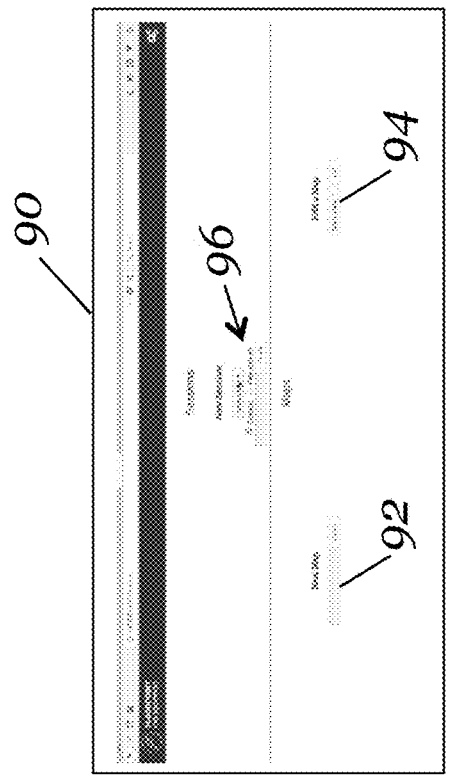

FIG. 12 is a screen shot 100 of a display presented to a user according to one aspect of the invention. As shown in FIG. 12, screen shot 100 presents a grid 102 to the user for defining the desired floor plan, for example, based upon the information presented in screen shot 90 shown in FIG. 11, for example, floor plan square footage.

Figure 13:
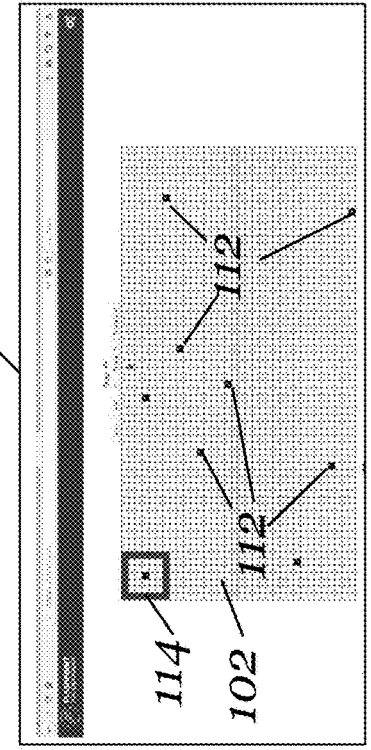

FIG. 13 is a screen shot 110 of a display presented to a user according to one aspect of the invention. As shown in FIG. 13, screen shot no presents the grid 102 shown in FIG. 12 and the user defined locations of sensors 112 on floor plan grid 102. According to aspects of the invention, the locations of sensors 112 may be provided by any convenient method, including touch screen, stylus, cursor, and/or a predefined data file.

Figure 14:
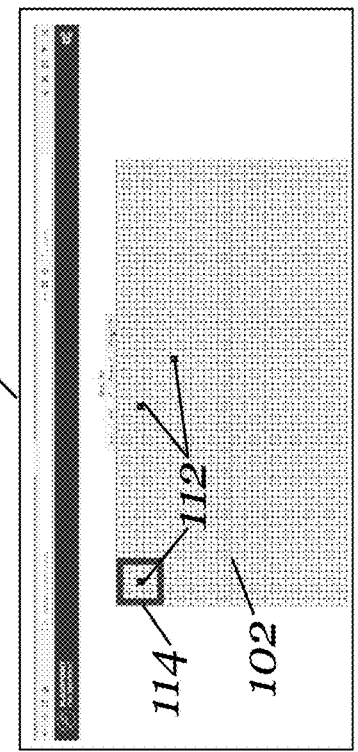

FIG. 14 is a screen shot 120 presenting the grid 102 shown in FIGS. 12 and 13 and further user defined locations of sensors 112 on floor plan grid 102. According to aspects of the invention, the locations of sensors 112 may be provided by any convenient method, including touch screen, stylus, cursor, and/or a predefined data file. Other data that may be input by a user in fields or radio buttons in screen shots 110 and 120 of FIGS. 13 and 14, respectively, include, but are not limited to, type of sensor 112 and elevation of sensor 112 off of the floor. The square structure 114 shown in FIGS. 13 and 14 represents a vertical duct or heating plenum that may be present, and, in this example, a sensor 112 is located within the duct.

Figure 15:
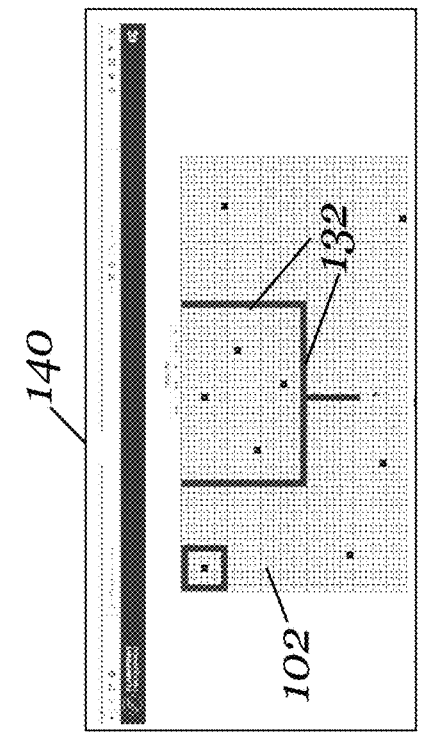
Figure 16:
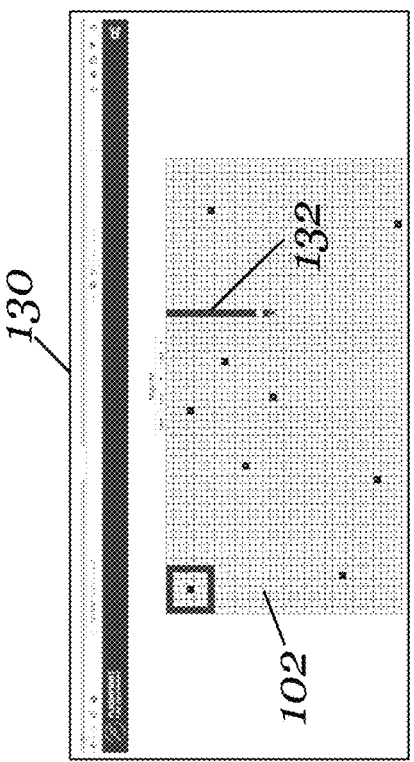
Figure 17:
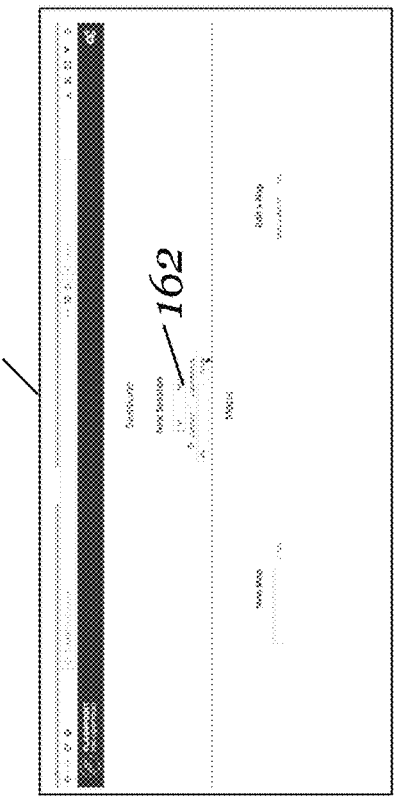

FIGS. 15 through 17 are screen shots 130, 140, and 150, respectively, of a user interface that may be used for user input according to one aspect of the invention for progressively inputting the locations of walls 132 within grid 102 shown in FIG. 14. As shown in FIGS. 15 through 17, user input may typically include one or more locations of a hazard 134, such as, a source of fire, flame, heat, chemical spill, and/or smoke, among other hazards, and its characteristics, the propagation of which provides the basis for the analysis being performed. According to aspects of the invention, the locations of walls 132 and hazards 134 may be provided by any convenient method, including touch screen, stylus, cursor, and/or a predefined data file.

Figure 18:
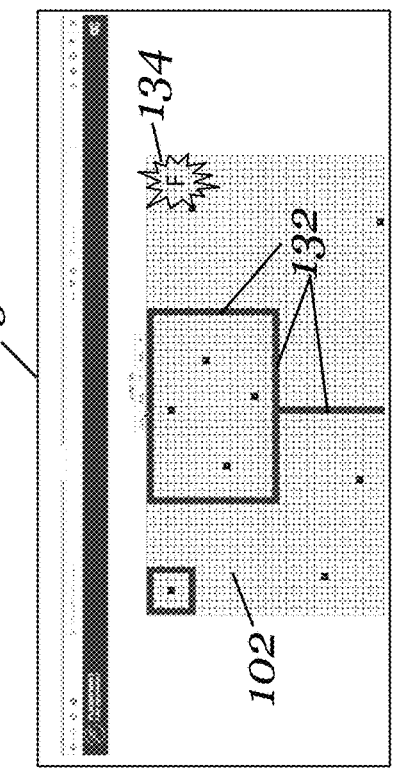

FIG. 18 is a screen shot 160 of a display presented to a user similar to screen shot shown in FIG. 11 according to one aspect of the invention. As shown in FIG. 18, screen shot 160 includes a drop down menu 162 for the user to select the type of analysis to be performed on the ambient condition data collected by sensors 112. The type of analysis that may be selected by the user includes, but is not limited to, instantaneous ambient conditions detected by the sensors, 112, for example, temperature; the time variation in an ambient condition detected; a condition gradient analysis, for example, an oxygen or CO gradient analysis; a chemical concentration analysis, for example, a VOC concentration analysis; and/or a personnel location analysis, among others.

FIGS. 19 through 22 are screen shots 170, 180, 190, and 200, respectively, of progressive system 10 outputs displayed according to one aspect of the invention, as the system processes the data detected and manipulated. For example, as shown in FIG. 19, aspects of the invention may display the condition 172 detected by each sensor 112, for example, a temperature, and display the calculated variation or gradient 174 of the condition between sensors 112, for example, as interpolated from the data collected by the sensors 112 and building factors, such as, the R-value of walls, the type of building construction, obstructions in compartments, openings in compartments, the presence and location of sprinklers, and stairwell location and size, among other factors. As also shown in FIG. 19, in one aspect, a legend 176 may be provided to associate the value of the condition displayed, for example, by color as shown, though other visual indicia may be provided.

Figure 23:
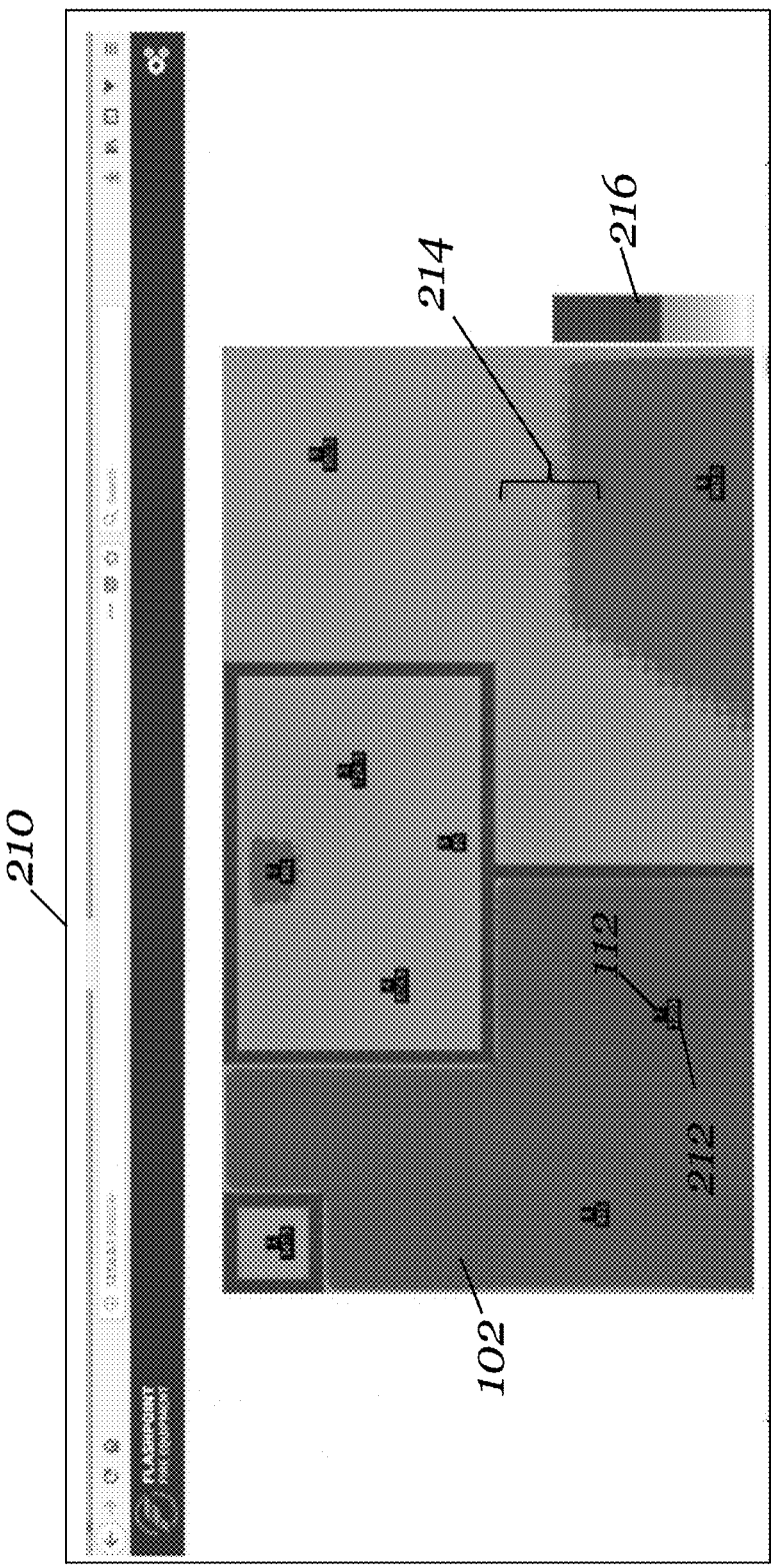
FIG. 23 is a graphical display of the output data provided by one aspect of the invention.

FIG. 23 are a screen shot 210 of the results of one analysis of the detection and manipulation of the ambient condition data detected as progressively displayed in FIGS. 19 through 22. As shown in FIG. 23, the results displayed by aspects of the invention may include, the condition 212 detected by each sensor 112, for example, temperature, the calculated variation or gradient 214 of the condition between sensors 112, and legend 216 associating the value of the condition displayed.

According to aspects of the invention, system 10 may display "raw data," that is, data reflective of the condition detected, such as, temperature, or interpolate data between detected data points, and visually display the data (for example, temperature as a "heat map") overlaid on a building map or floor plan. Among other data that may be displayed include calculated victim tenability, victim survivability zones, for example, generated by analyzing multiple streams of detected data, building geometry, and wall layout, among other things.

According to one aspect of the invention, the two or more ambient conditions detected and/or computed by aspects of the invention may be displayed individually or collectively, for example, data may be displayed as "layers" on an output display with one or more sets of data "layered" or "overlaid" on a building map or floor plan.

In one aspect, the data collected and/or manipulated may be recorded or stored for future analysis and/or playback.

In one aspect, the invention may identify or mark key events that take place during training. For example, for future display and training.

In one aspect, the system and method of the invention may include transmitting data collected and/or manipulated to offsite networks and/or servers, for example, via the Internet, for further processing, analysis, review, and/or training.

Figure 25:
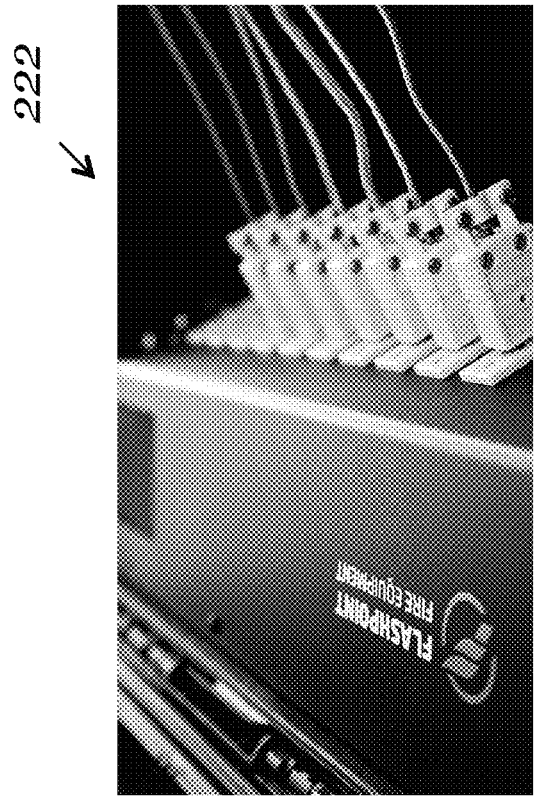
FIG. 25 is a perspective view of wire inputs from sensors to the system in the portable case shown in FIG. 24 according to an aspect of the invention.
Figure 24:
FIG. 24 is a perspective view of a portable case containing a system according to one aspect of the invention.

FIG. 24 is a perspective view of portable case 220, for example, a "clamshell" case, containing a system 10 according to one aspect of the invention. FIG. 25 is a perspective view of wire inputs 222 from sensors to the receiver in system 10 in the portable case 220 shown in FIG. 24 according to an aspect of the invention.

Figure 26:
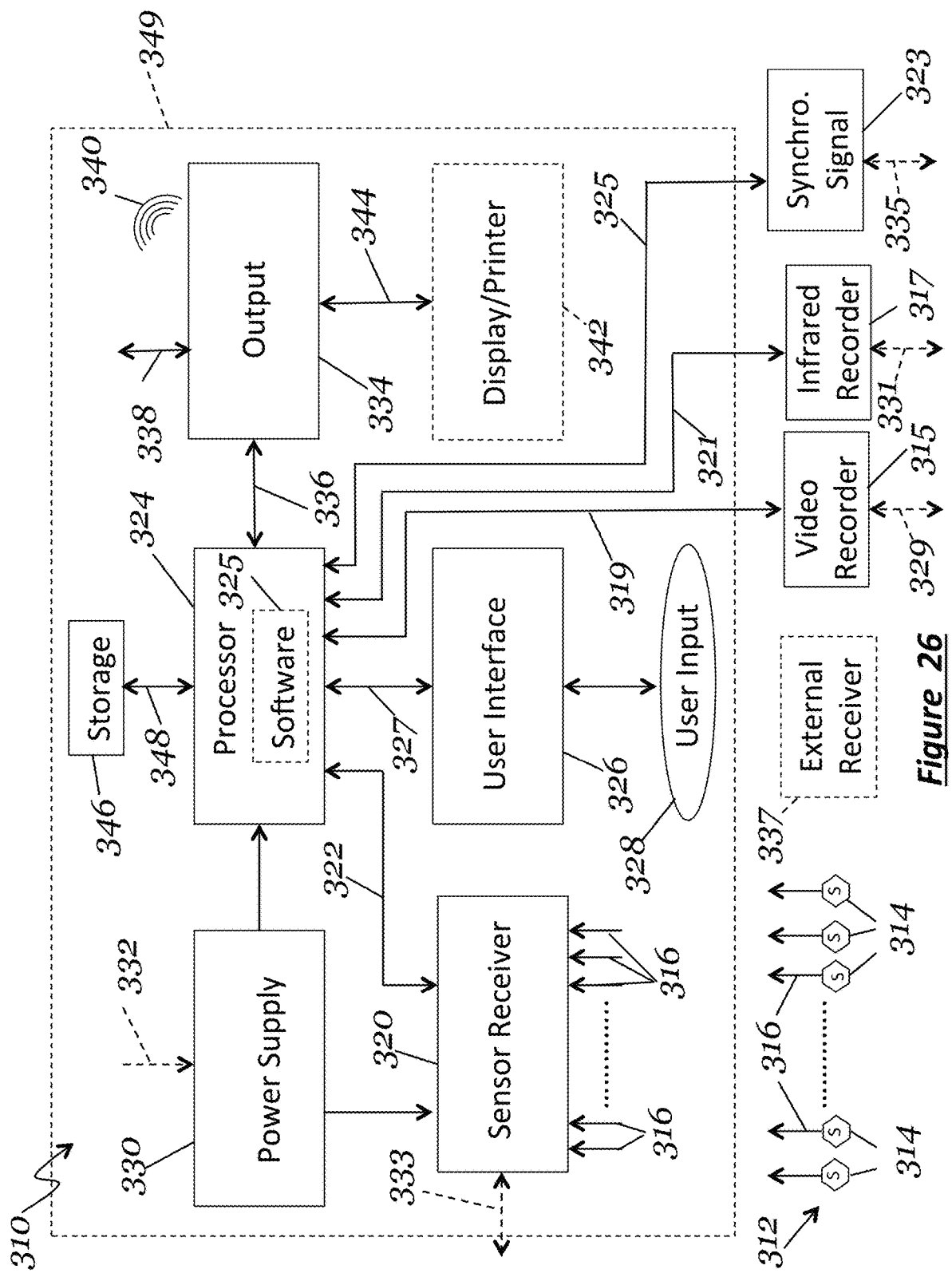
FIG. 26 is a schematic diagram of a system for monitoring or training firefighters and other personnel according to one aspect of the invention.

FIG. 26 is a schematic diagram of a system 310 for monitoring or training firefighters, first responders, or others according to another aspect of the invention. As shown in FIG. 26, system 310 includes a plurality 312 of sensors 314, each of the sensors 314 configured to detect an ambient condition, such as, temperature, and output a signal 316 corresponding to the detected ambient conditions. Signal 316 may be a wired or wireless signal. According to aspects of the invention, system 310 includes one or more sensor receivers 320 adapted to receive signals 316 (wired and/or wireless) and then transmit (wired and/or wirelessly) one or more signals 322 corresponding to the detected ambient conditions to one or more processors 324. In addition, in one aspect, system 310 may also include one or more video recorders 315, for example, a still and/or video camera, and/or one or more infrared recorders 317, for example, an infrared or thermal camera or infrared or thermal video image detector. According to aspects of the invention, 3 or more, 4 or more, or 10 or more video recorders 315 and/or infrared recorders 317 may be provided.

In the following discussion, in describing aspects of the invention, for the sake of ease of illustration, the ambient condition detected by sensors 314 may be referred to as "temperature," and sensors 314 may be referred to as "temperature sensors." However, it is envisioned that aspects of the invention are not limited to the sensing of temperature, but may comprise sensors adapted to detect one or more of a broad range of conditions, characteristics, and features of the environment and/or the atmosphere, for example, within an enclosure. These conditions include, but are not limited to, oxygen ($O_2$) concentration, carbon monoxide (CO) concentration, carbon dioxide ($CO_2$) concentration, percent of "lower explosion limit" (% LEL), percent of "upper explosion limit" (% UEL), presence or concentration of volatile organic compounds (VOCs), hydrogen cyanide (HCN) presence or concentration, heat flux, the presence of personnel (for example, victims), the presence of firefighting personnel, the proximity of personnel (for example, of a firefighter or first responder to a victim), personnel location (for example, of a firefighter or first responder), the presence of a victim "dummy" (for example, during training exercises), the location of a victim dummy, the evidence of water application (for example, from firefighting hose lines), gas velocities (for example, air velocity and/or smoke velocity), the presence or concentration of particulates in the air (for example, of nanoparticle particulates). These and other ambient conditions can be detected and, for example, displayed, according to aspects of the present invention. Other conditions, characteristics, and features that may be detected by sensors 314 will be apparent to those of skill in this art, for example, professional firefighters.

System 310 also includes a user interface 326 configured to receive user input 328, for example, sensor location, start/stop scenario, record scenario, the identification or marking of key milestones and/or events during the evolution or training exercise, to change views, and to create floor plans, among other user inputs. User interface 326 may be a keypad, a keyboard, a stylus controlled screen, a touch screen, a voice-activated device, or any other device configured to receive input from a user. User interface 326 may be adapted to receive input from a local and/or a remote user (wired and/or wirelessly), for example, a user accessing system 310 via a network, for instance, over the Internet and/or a local network. User interface 326 may typically be configured to communicate (wired and/or wirelessly) with processor 324 via connection 327, for example, to transfer electrical signals corresponding to the user input to processor 324.

System 310 in FIG. 26 may also include a power supply 330 adapted to provide electrical power to the components of system 310. Power supply 330 may be powered by connection 332 by power from the grid, from a local power source (for example, solar power, wind power, or fuel cell power), or may include one or more batteries, for example, rechargeable batteries.

System 310 may also include one or more output devices 334, for example, a transmitter adapted to receive (wired and/or wirelessly) electrical signals 336 from processor 324 and transmit signals corresponding to the signals received, for example, by wire 338 and/or wirelessly 340 to a local or remote receiver (not shown).

In one aspect, system 310 may include one or more displays 342 adapted to receive electrical signals 344 from output device 334 and display data corresponding to the received signals, for example, one of more ambient conditions detected by the sensors 314, one or more videos recorded by recorder 315 and/or recorder 317, and or data produced from ambient conditions detected by sensors 314 by processor 324. The device 342 may also be a printer.

In one aspect, system 310 may include one or more digital storage devices 346 adapted to communicate with processor 324 (wired or wirelessly) via connection 348. The storage device 346 may be a conventional digital storage device.

The one or more processors or central processing units (CPUs) 324, for example, a computer processor, typically includes one or more memory devices containing software 325 configured to manipulate the data streams from sensors 314 and the data streams from user interface 326 and generate data of use to, for example, the user. Software 325 is typically executable on processor 324 and software 325 may be adapted to access storage device 346. For example, software 325 may typically be adapted to introduce information to, extract information from, and/or otherwise manipulate data on storage device 346; for instance, images recorded by recorders 315 and/or 317.

As also shown in FIG. 26, system 310 may be provided in an enclosure, cabinet, or case 349, for example, a portable case where system 310 can be conveniently transported to, for example, a firefighter-training site or facility. In another aspect, system 310 may not be readily portable, but may be substantially permanently installed at a firefighter-training site or facility.

Video recorder 315 may be any electronic device adapted to record visual video images, for example, images in the visual electromagnetic spectrum. Video recorder 315 may be a video camera, as known in the art. Video recorder 315 may also be an image-capturing device, for example, a camera, such as, a digital camera, an analog or film-based camera, a video camera, a television camera; a mobile device or phone; or a computer, such as, a handheld computer, a tablet computer (for example, an Apple iPad™ tablet computer), or a laptop computer; among other devices. Video recorder 315 may typically include some form of image storage capacity, that is, some means for storing the captured images, for example, on digital storage media, such as, a hard disk drive, flash memory, compact disk (CD), optical disc, such as, digital video disk (DVD), and the like; or film.

As shown in FIG. 26, video recorder 315 may typically be configured to communicate (wired and/or wirelessly) with processor 324 via connection 319, for example, to transfer electrical signals corresponding to the captured images to processor 324.

Infrared recorder 317 shown in FIG. 26 may be any electronic device adapted to record infrared or thermal video images, for example, images in the infrared electromagnetic spectrum. Infrared recorder 317 may be adapted to record thermal images reflective of the heat or fire present in the field of view of infrared recorder 317, such as, within a room of a structure. Infrared recorder 317 may be an infrared video camera, as known in the art. Infrared recorder 317 may also be an infrared image-capturing device, for example, a camera adapted to detect infrared electromagnetic radiation, such as, an infrared digital camera, an analog or film-based infrared camera, an infrared video camera, an infrared television camera; an infrared mobile device or phone; or a computer, such as, a handheld computer, a tablet computer (for example, an Apple iPad™ tablet computer), or a laptop computer having infrared detection capability, among other devices. Infrared recorder 317 may typically include some form of image storage capacity, that is, some means for storing the captured infrared images, for example, on digital storage media, such as, a hard disk drive, flash memory, compact disk (CD), optical disc, such as, digital video disk (DVD), and the like; or film.

As shown in FIG. 26, infrared recorder 317 may typically be configured to communicate (wired and/or wirelessly) with processor 324 via connection 321, for example, to transfer electrical signals corresponding to the captured infrared images to processor 324.

According to one aspect of the invention, system 310 includes at least one synchronizing device or "synchronizer" 323. According to this aspect, synchronizing device 323 may be adapted to emit at least one signal, for example, an audio, visual signal, and/or an electrical signal that can be used to synchronize or coordinate the data and images captured by system 310, for example, to facilitate synchronization of and later review and analysis of the data and images collected.

For example, in one aspect, synchronizing device 323 may emit an audio signal, such as, an alarm, a siren, a gunshot, a "beep," or other audible indicia. In another aspect, synchronizing device 323 may emit a visual signal, such as, a light or a flag or other visual indicia. In one aspect, the visual signal may comprise a human gesture, such as, a wave, or a human audible signal, such as a shout or word, such as, "start" or "action," among others. Regardless of the nature of the event, the signal emitted by synchronizing device 323 may be used to coordinate the data and images collected such that the time of capture or occurrence of the data and images can be correlated and/or temporally associated, for example, for or during later review.

In one aspect, synchronizing device 323 may comprise a signal transmitter adapted to transmit a synchronizing signal to firefighters and/or to processor 325 and/or to recorder 315 and/or 317. For example, in one aspect, synchronizing device 323 may transmit or "broadcast" a synchronizing signal, for example, an audible signal, to firefighters wearing signal receivers, such as, portable radios or headsets. In one aspect, the transmitted audible signal may be detectable by recorders 315 and/or 317, for instance, detected and recorded with the video images detected by recorders 315 and/or 317, and be used for subsequent synchronization as disclosed herein.

Synchronizing device 323 may typically be configured to communicate (wired and/or wirelessly) with processor 324 via connection 325, for example, to transfer synchronizing signal of the captured images and data to processor 324.

In one aspect, the image and data and images may be transmitted to, received by, processed, and/or displayed by one or more external receivers 337, for example, a server accessible via the Internet or a local server. In one aspect, video recorder 315 may communicate with receiver 337 (wired and/or wirelessly) via connection 329; and/or infrared recorder 317 may communicate with receiver 337 (wired and/or wirelessly) via connection 331; and/or sensor receiver 320 may communicate with receiver 337 (wired and/or wirelessly) via connection 333; and/or synchronizer 323 may communicate with receiver 337 (wired and/or wirelessly) via connection 335.

Figure 32:
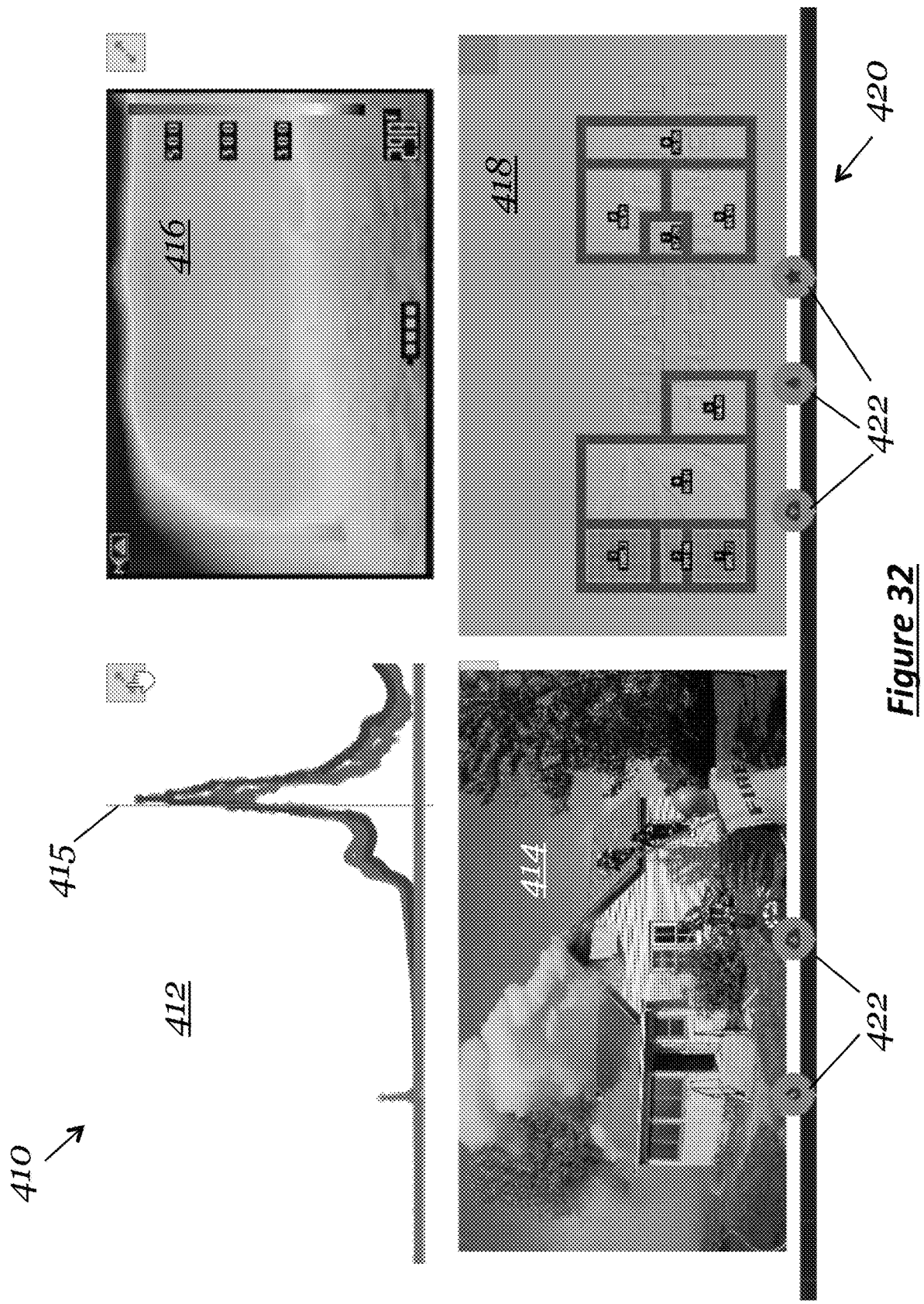
FIG. 32 is a screen shot of system output having multiple images according to one aspect of the invention.

For example, in one aspect, sensor data received by sensor receiver 320 may be transmitted or exported via connection 333, for example, directly or via a digital storage device, for example, a USB thumb drive or the like, to external server 337. Similarly, the images from video recorder 315 and infrared recorder 317 may be uploaded, directly or via a storage device, to external receiver 337 for processing and/or display. Also, the synchronizer signal from video synchronizer 323 may be uploaded, directly or via a storage device, to external receiver 337 for processing and display. External receiver 337 may perform the generation and output and/or display of real-time sensor data, data curves, heat maps, and other output disclosed herein. As disclosed herein, the video images and the infrared images may be synchronized with the other data streams, for example, the sensor data, for display, review and analysis. For example, the synchronized data and images can be displayed and referenced to a time line (as shown in FIG. 32). If external receiver 337 is available over the Internet, local network, or local server, the synchronized data and videos may be viewed on a website, for example, a dedicated website with limited accessibility by the user.

Figure 27:
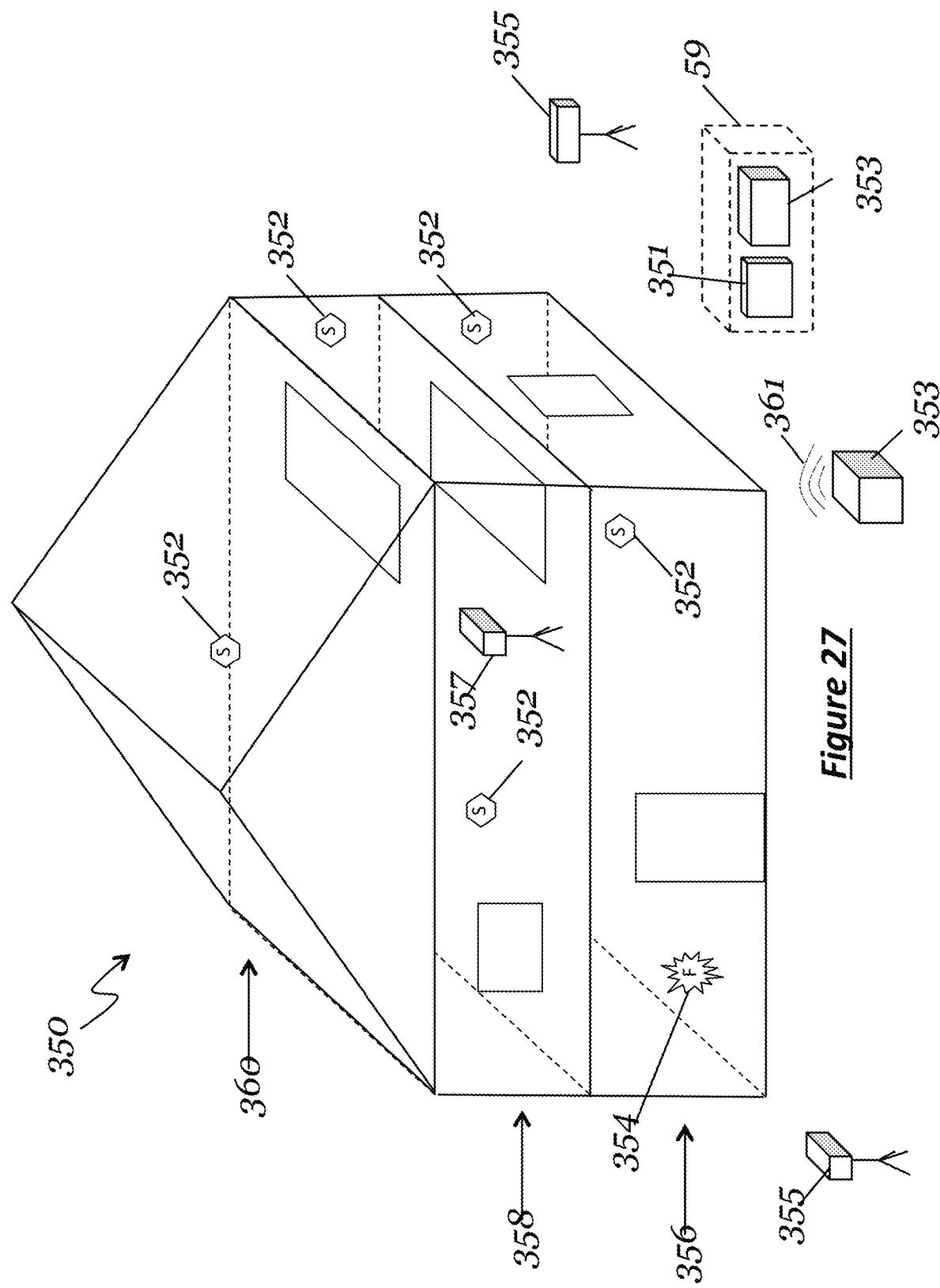
FIG. 27 is a schematic diagram of a building floor plan for sensor data and image capture according to one aspect of the invention.

FIG. 27 is a schematic diagram of a building 350 having a data and image capture system according to one aspect of the invention. According to aspects of the invention, building 350 may include one or more sensors or probes 352 and one or more sources of fire 354, for example, a source of fire 354 identified and located by a user, and one or more video recorders 355 and/or infrared recorders 357, as disclosed herein, which may be positioned within or outside of building 350. According to aspects of the invention, building 350 or similar structures may have two or more floors and be used for aspects of the invention, for example, for firefighter training. Though a first floor 356, a second floor 358, and attic 360 are shown in FIG. 27, building 350 may comprise any conceivable structure or facility, home or residence, office or factory, which may be used for firefighter training and/or evaluation. In one aspect, sensors 352 and recorders 355 and 357 may be located within or about an actual physical structure.

In another aspect, a model of structure 350 may be created, for example, a "virtual" model, and sensors 352 and recorders 355 and 357 may be located within or about the model. In one aspect of the invention, aspects of the invention may be applied to scale model structures, for example, "doll house" type structures, that can be used for training to illustrate fire propagation that may occur in full-scale structures. For example, in one aspect, sensors 352 may be located within a physical scale model structure and recorders 355 and 357 may be located within or about a physical scale model structure. In another aspect, models of scale models, for example, a "virtual" scale model, may be created and sensors 352 and recorders 355 and 357 may be located within or about the scale model.

As shown in FIG. 27, according to an aspect of the invention, a synchronizing device 353 may be provided and adapted to emit a signal 361, as disclosed herein. According to aspects of the synchronizing device 353 may communicate with a user interface 351 and/or processor 353 wirelessly or by wire.

FIG. 27 also identifies a user interface 351 and a processor 353 that may be provided, as indicted in the diagram of FIG. 26. For example, user interface 351 may be a handheld interface, such as, tablet computer, such as, an Apple® iPad™, a handheld device, such as, an Apple iPhone™, or a laptop computer. In one aspect, the user interface 351 and processor 353 may provided in a single device 359, such as, handheld device, tablet, or laptop. According to aspects of the invention sensors 352, video recorders 355, and/or infrared recorder 357 may communicate with user interface 351 and processor 353 wirelessly or by wire.

In addition to the displays and analyses shown in FIGS. 28 through 32 and the three-dimensional structure display and analysis shown in FIG. 27, in one aspect of the invention, elevation views for structures may also be displayed and analyzed. For example, in one aspect, a front elevation view or an internal elevation view, for instance, through a cross section of a structure may be displayed and analyzed. In one aspect, similar to the user input shown in FIG. 27, an elevation view of a structure with one or more floors may be displayed and the walls, sensors 352, and/or recorders 355 and 357 located by user input. For example, an elevation view of a structure may be provided showing the vertical propagation of a fire, a gas leak, or a volatile chemical spill.

Figure 28:
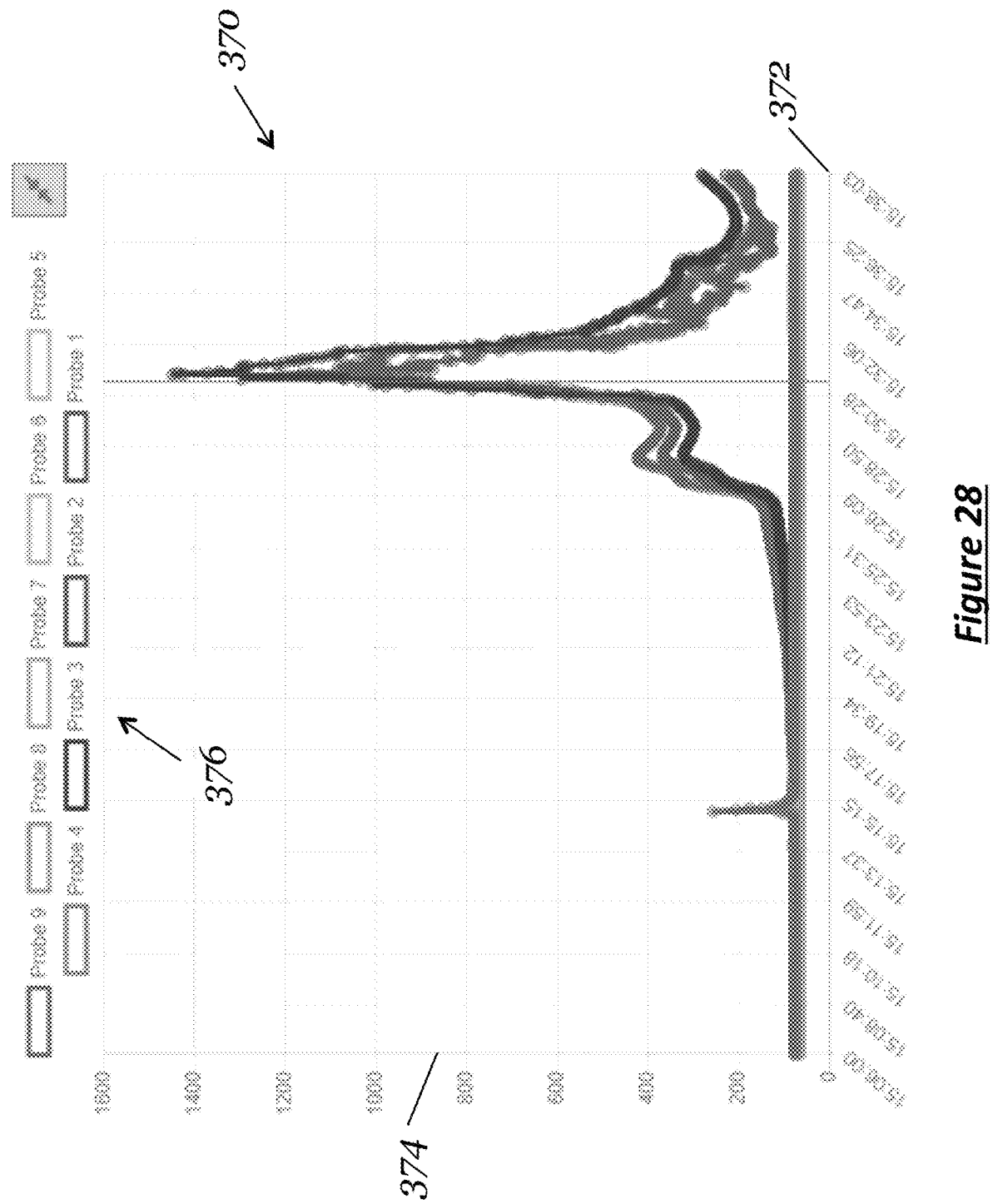
FIGS. 28 through 31 are screen shots of system output according to one aspect of the invention.

FIGS. 28 through 32 are screen shots of system output according to one aspect of the invention. FIG. 28 presents a typical plot 370 of curves of the temperatures detected by sensors 352, for example, temperature sensors, for example, as a function of time. The abscissa 372 of plot 370 may be time, for example, in seconds, and the ordinate 374 of plot 370 may be temperature, for example, in degrees F. or C. As shown in FIG. 28, plot 370 may include a legend 376 associating each curve with a specific sensor or probe 352, for example, by color or by line type.

Figure 29:

FIG. 29 is a still image 380 of one of the plurality of series of visual images that may be recorded by one or more video recorders 355 shown in FIG. 27. For example, as shown, image 380 may be one image of a series of video images recorded by video recorder 355 of the progress of a fire in a house that is being addressed by firefighters.

Figure 30:
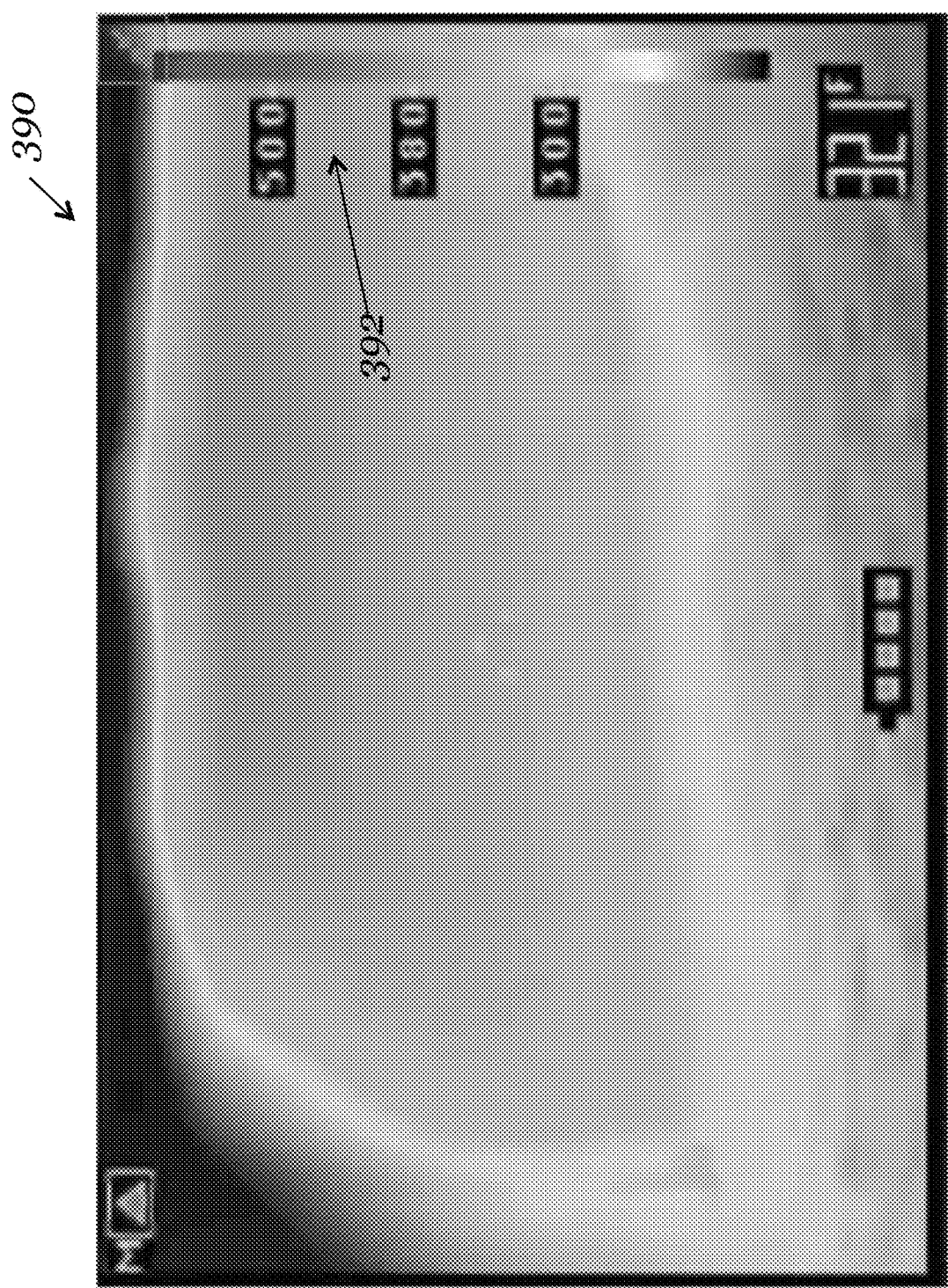

FIG. 30 is a still infrared image (or a "heat map") 390 of one of a plurality of series of infrared images that may be recorded by one or more infrared recorders 357 shown in FIG. 27, for example, located within a room of structure 350.

For example, as shown, image 390 may be one image of a series of infrared images recorded by infrared recorder 357 of the progress of a fire in a room of a house or a building. In one aspect, one or more infrared recorders 357 may be positioned within a structure 350 and/or outside a structure 350.

As shown in FIG. 30, infrared image 390 may include a legend 392 associating the displayed representation of the infrared image 390, for example, the visual color of the image, with the infrared radiation frequency and the corresponding temperature (degrees F. or C) detected by the infrared recorder 357. In this example, the higher temperatures detected by infrared recorder 357 range from about 300 degrees F. to about 500 degrees F.

Figure 31:
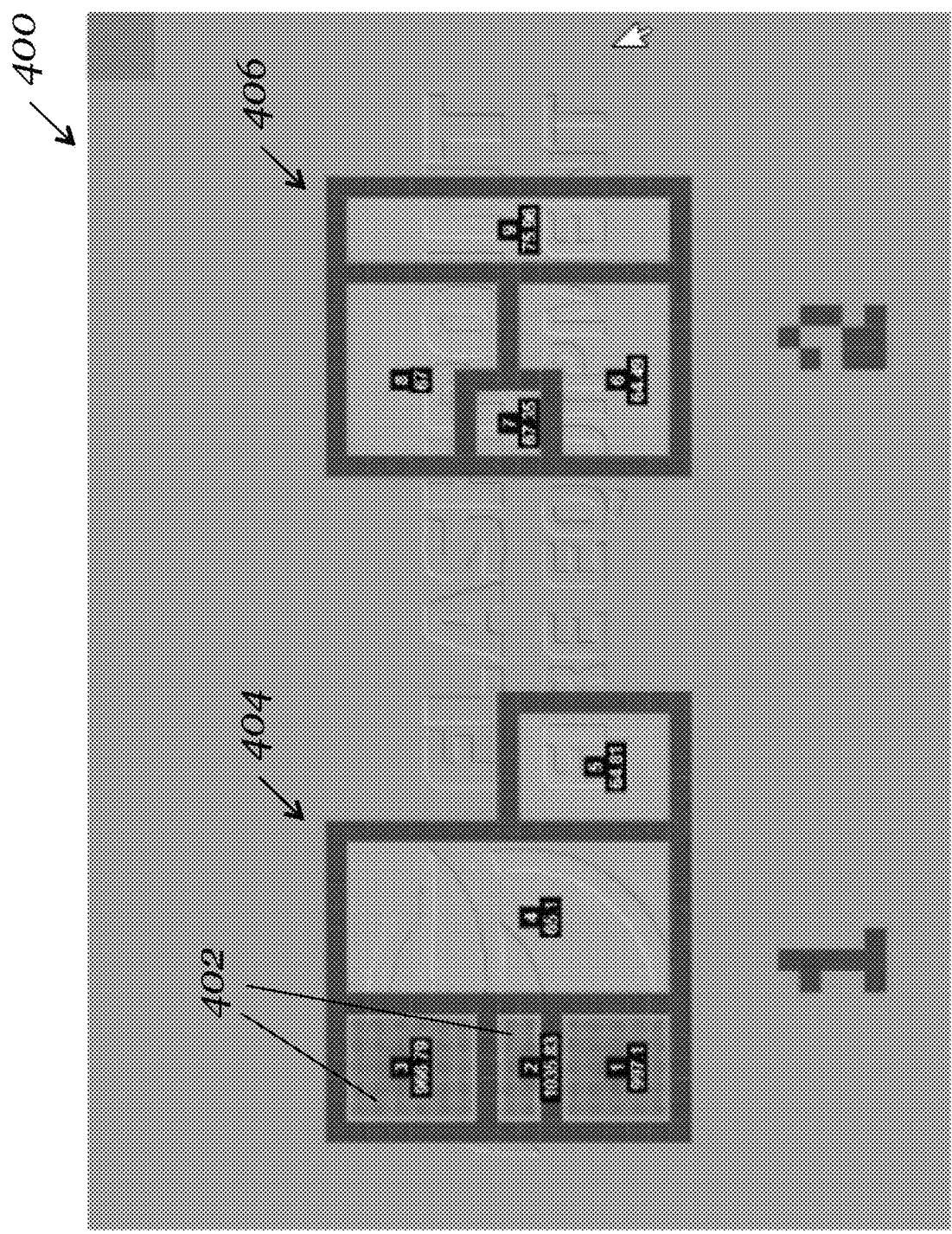

FIG. 31 is a schematic illustration 400 of one output according to one aspect of the invention. For example, as shown in FIG. 31, an aspect of the invention may display the temperature 402, among other conditions, detected by each sensor 352 (see FIG. 27) within a first-floor plan 404 and within a second-floor plan 406 of a structure, such as, structure 350 shown in FIG. 27. In one aspect, illustration 400 may display a calculated variation or gradient of the temperature between sensors 352, for example, as interpolated from the data collected by the sensors 352 and building factors, such as, the R-value of walls, the type of building construction, obstructions in compartments, openings in compartments, the presence and location of sprinklers, and stairwell location and size, among other factors. As also shown in FIG. 31, in one aspect, the value of the detected temperature 402 may be displayed and/or displayed by an associated indicia, for example, by color as shown, though other visual indicia may be provided. Further aspects of the invention associated with FIG. 31 may be found in the previous aspects of the invention disclosed herein.

FIG. 32 is a screen shot of a system output display 410 and user interface having multiple images according to one aspect of the invention. As shown in FIG. 32, in one aspect, the images and plots shown in FIGS. 28 through 31, among other recorded data, images, and information, may be displayed to the user in a single display. For example, display 410 may include a display of one or more detected temperatures 412, one or more recorded video images 114, one or more recorded infrared images 116, and one or more detected temperatures and their locations 118.

As shown in FIG. 32, according to aspects of the invention, the detected temperatures in image 412, the recorded video images 414, the recorded infrared images 416, and detected temperatures 418 may be synchronized, for example, via the sounding of or display of a signal. As shown in FIG. 32, a time display 420 may be provided which is consistent with the synchronization of the data shown. In one aspect, the time display 420 shown in FIG. 32 may be related to, for example, synchronized with, the horizontal time display shown in image 412, for example, the images 414, 416 and 418 may correspond with the time indicated by vertical line 415 shown in image 412. For example, in one aspect, one or more icons 422 along time display 420 may be provided and accessed by the user. For example, icons 422 may identify the time of the common initiation or synchronizing signal or the time of a significant event. In one aspect, the timing of a significant identified by icons 422 may be the time of arrival of firefighters at the scene of the fire; the time of first application of water to the fire; the time of the opening or access to the structure, such as, the forced opening of a doorway or window; and the time of the penetration of a surface, such as, a wall; among other salient occurrences during the firefighting process.

According to aspects of the invention, the user interface shown in FIG. 32 allows users to "scroll through" the progress or "evolution" of the firefighting event recorded from start to finish and, for example, observe all data and images together. In addition, one or more of the images 412, 414, 616, and/or 118 may be selected and enlarged by the user to review details of the specific data or image, for example, as shown in FIGS. 28 through 31.

As disclosed herein, aspects of the invention include systems and methods for training firefighters and other first responders, law enforcement, military personnel, and hazmat personnel, among others, in the propagation of fire and/or hazardous material in a structure and the consequences and implications of fire fighting techniques and practices.

According to aspects of the invention, images and data for a firefighting event, for example, a firefighting training event, can be captured during training events (or during non-training live fire events), and then compiled and synchronized for later for review and analysis. For example, a fire department may employ 4 or more video cameras to record four sides of a training building, and use one or more infrared thermal imaging cameras to record the thermal characteristics of one or more interior rooms of the training building, and a series of temperature sensors in the training building. After the event, the data and images can be compiled and synchronized so that an instructor can "scroll through" the evolution of the event during a debriefing or critique of the firefighters. For example, the trainer may identify to the firefighters who entered a building how the opening of a window by an exterior firefighting crew, as indicated by video images of the actions of the exterior firefighting crew, can increase the temperatures within the building, as indicated by the increases in the infrared thermal images and/or in the temperature plots. In addition, aspects of the invention can illustrate the effect upon fire temperature, as indicated by interior thermal images and/or temperature plots, of firefighters putting water on a fire, and then show temperatures correspondingly decreasing. Aspects of the invention provide these and other benefits and advantages.

Though aspects of the invention may be particularly advantageous for use in training firefighters and/or first responders, other aspects of the invention may be effective tools for monitoring personnel performance (for example, firefighter performance); for monitoring the safety or danger of an incidence of fire, gas leak, and/or chemical spill; for monitoring or evaluating the presence of "fuel" during fire, gas leak and/or chemical spill; for monitoring or evaluating building characteristics (such as, structural integrity and/or potential for collapse); and/or to conduct experiments (for example, on new fire fighting techniques or new firefighting equipment). Other uses of aspects of the invention will be apparent to those of skill in the art.

While various embodiments have been described above, it should be understood that these embodiments and their many aspects have been presented by way of example, and not limitation. It will be apparent to persons skilled in the relevant art that various changes in form and detail can be made therein without departing from the spirit and scope of the invention. Moreover, it is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The detailed description presented herein, therefore, is not to be taken in a limiting sense, and the scope of the present invention is defined only by the appended claims, appropriately interpreted, along with the full range of equivalents to which the claims are entitled.

Although the term "at least one" may often be used in the specification, claims and drawings, the terms "a", "an", "the", "said", etc. also signify "at least one" or "the at least one" in the specification, claims and drawings.

While several aspects of the present invention have been described and depicted herein, alternative aspects may be provided by those skilled in the art to accomplish the same objectives. Accordingly, it is intended by the appended claims to cover all such alternative aspects as fall within the true spirit and scope of the invention.

The invention claimed is:

1. A system for training firefighters, the system comprising:
   a plurality of sensors configured to detect at least one ambient condition, each of the sensors adapted to generate an electrical signal corresponding to the detected ambient condition;
   a receiver configured to receive the electric signals from the plurality of sensors;
   a digital storage device operatively connected to the receiver and adapted to store the electrical signals;
   a processor configured to receive the electrical signals from the receiver, the processor configured to use the electrical signals to calculate variations in the at least one ambient condition; and
   an output device configured to transmit at least some of the stored electrical signals for review.

2. The system as recited in claim 1, wherein the at least one ambient condition comprises at least one of temperature, humidity, chemical concentration, explosion limits, and presence of personnel.

3. The system as recited in claim 1, wherein the processor is further configured to receive physical conditions of an enclosure where the plurality of sensors is positioned and further use the physical conditions of the enclosure to calculate the variations in the at least one ambient condition.

4. The system as recited in claim 3, wherein the physical conditions of the enclosure comprise at least one of R-value of walls, type of building construction, obstructions in compartments of the enclosure, openings in compartments of the enclosure, the presence and location of sprinklers, and stairwell location and size.

5. The system as recited in claim 1, wherein the system further comprises a user interface.

6. The system as recited in claim 5, wherein the user interface is adapted to receive a location for each of the plurality of sensors.

7. The system as recited in claim 5, wherein the user interface is adapted to receive physical conditions of an enclosure where the plurality of sensors are located.

8. The system as recited in claim 1, the system further comprising:
   at least one video recorder configured to detect substantially continuous video images, the video recorder adapted to generate electrical signals corresponding to the detected video images.

9. The system as recited in claim 1, wherein the system further comprises a display adapted to receive the at least some of the electrical signals from the output device.

10. The system as recited in claim 9, wherein the display is further adapted to display the variations in the at least one ambient condition.

11. The system as recited in claim 9, wherein the variations in the at least one ambient condition comprise a heat map.

12. The system as recited in claim 11, wherein the heat map comprises a heat map on one of a building map and a floor plan.

13. A method for training firefighters, the method comprising:
   with a plurality of sensors, detecting at least one ambient condition and generating an electrical signal corresponding to the detected ambient condition;
   transmitting the electrical signals to a receiver;
   storing the electrical signals;
   using a processor configured to receive the electrical signals from the receiver, calculating variations in the at least one ambient condition; and
   displaying the stored electrical signals for review.

14. The method as recited in claim 13, wherein the at least one ambient condition comprises at least one of temperature, humidity, chemical concentration, explosion limits, and presence of personnel.

15. The method as recited in claim 13, wherein detecting at least one ambient condition comprises detecting the at least one ambient condition in an enclosure.

16. The method as recited in claim 13, wherein the enclosure comprises a firefighter training structure.

17. The method as recited in claim 13, wherein the method further comprises defining physical conditions of an enclosure where the plurality of sensors is located.

18. The method as recited in claim 13, wherein displaying the stored electrical signals for review comprises displaying the stored electrical signals as the ambient conditions on a floor plan.

19. The method as recited in claim 13, further comprising:
   recording substantially continuous video images with at least one video recorder, the at least one video recorder adapted to generate electrical signals corresponding to the detected video images.

20. The method as recited in claim 19, wherein the method further comprises displaying images of the electrical signals corresponding to the detected at least one ambient condition and images of the recorded substantially continuous video images.

21. The method as recited in claim 13, wherein the method further comprises displaying the variations in the at least one ambient condition for review.

22. The method as recited in claim 21, wherein displaying the variations in the at least one ambient condition comprises displaying the variations as a heat map.

23. The method as recited in claim 22, wherein displaying the variations in the at least one ambient condition comprises displaying the variations as a heat map on one of a building map and a floor plan.

24. A system for training firefighters, the system comprising:
   a plurality of sensors configured to detect at least one ambient condition, each of the sensors adapted to generate an electrical signal corresponding to the detected ambient condition;
   a receiver configured to receive the electric signals from the plurality of sensors;
   a digital storage device operatively connected to the receiver and adapted to store the electrical signals;

at least one video recorder configured to detect substantially continuous video images, the video recorder adapted to generate electrical signals corresponding to the detected video images; and a synchronizer adapted to synchronize the electric signals from the plurality of sensors with the electrical signals from the at least one video recorder.

25. The system as recited in claim 24, wherein the synchronizer comprises one of an audible signal, a visual signal, and a haptic signal.

26. A method for training firefighters, the method comprising:

with a plurality of sensors, detecting at least one ambient condition and generating an electrical signal corresponding to the detected ambient condition;

transmitting the electrical signal to a receiver;

storing the electrical signals;

recording substantially continuous video images with at least one video recorder, the at least one video recorder adapted to generate electrical signals corresponding to the detected video images; and synchronizing the electric signals from the plurality of sensors with the electrical signals from the at least one video recorder.

* * * * *

UNITED STATES PATENT AND TRADEMARK OFFICE
CERTIFICATE OF CORRECTION

PATENT NO. : 11,298,575 B2
APPLICATION NO. : 16/377438
DATED : April 12, 2022
INVENTOR(S) : O'Donnell et al.

Page 1 of 1

It is certified that error appears in the above-identified patent and that said Letters Patent is hereby corrected as shown below:

In the Claims

Column 18, Claim 11, Line 1: Replace "claim 9" with "claim 10"

Column 18, Claim 16, Line 1: Replace "claim 13" with "claim 15"

Column 19, Claim 26, Line 4: Replace "an" with "at least one"

Column 19, Claim 26, Line 5: After "detected" insert --at least one--

Column 19, Claim 26, Line 6: After "the" insert --at least one--

Column 19, Claim 26, Line 7: Replace "electrical signals" with "at least one electrical signal"

Column 19, Claim 26, Line 12: Replace "electrical signals" with "at least one electrical signal"

Signed and Sealed this
Twenty-third Day of May, 2023

Katherine Kelly Vidal
*Director of the United States Patent and Trademark Office*